(12) United States Patent
Shambroom

(10) Patent No.: US 7,366,900 B2
(45) Date of Patent: Apr. 29, 2008

(54) PLATFORM-NEUTRAL SYSTEM AND METHOD FOR PROVIDING SECURE REMOTE OPERATIONS OVER AN INSECURE COMPUTER NETWORK

(75) Inventor: W. David Shambroom, Arlington, MA (US)

(73) Assignee: Verizon Laboratories, Inc., Waltham, MA (US)

( * ) Notice: Subject to any disclaimer, the term of this patent is extended or adjusted under 35 U.S.C. 154(b) by 1030 days.

(21) Appl. No.: 09/759,100

(22) Filed: Jan. 12, 2001

(65) Prior Publication Data

US 2001/0020274 A1    Sep. 6, 2001

Related U.S. Application Data

(63) Continuation-in-part of application No. 09/309,695, filed on May 11, 1999, now Pat. No. 6,198,824, which is a continuation of application No. 08/799,402, filed on Feb. 12, 1997, now Pat. No. 5,923,756.

(51) Int. Cl.
*H04L 9/00* (2006.01)
(52) U.S. Cl. ............... 713/168; 713/153; 713/156; 380/279
(58) Field of Classification Search ............ 713/201, 713/200; 380/279
See application file for complete search history.

(56) References Cited

U.S. PATENT DOCUMENTS

| | | | |
|---|---|---|---|
| 4,672,572 A | 6/1987 | Alsberg | |
| 5,005,200 A * | 4/1991 | Fischer | 380/30 |
| 5,241,594 A | 8/1993 | Kung | |
| 5,313,521 A | 5/1994 | Torii et al. | 380/25 |
| 5,349,643 A * | 9/1994 | Cox et al. | 713/155 |
| 5,416,842 A * | 5/1995 | Aziz | 380/30 |
| 5,511,122 A | 4/1996 | Atkinson | 380/23 |
| 5,590,199 A * | 12/1996 | Krajewski et al. | 713/159 |
| 5,604,803 A * | 2/1997 | Aziz | 713/155 |
| 5,729,594 A * | 3/1998 | Klingman | 379/93.12 |
| 5,764,687 A | 6/1998 | Easton | 380/23 |
| 5,768,504 A * | 6/1998 | Kells et al. | 713/201 |
| 5,774,551 A | 6/1998 | Wu et al. | |
| 5,815,574 A | 9/1998 | Fortinsky | |
| 5,862,325 A | 1/1999 | Reed et al. | |

(Continued)

FOREIGN PATENT DOCUMENTS

EP    001241851 A2 *    9/2002

OTHER PUBLICATIONS

Freier, Alan O., et al., The SSL Protocol, Version 3.0, Mar. 4, 1996.

(Continued)

*Primary Examiner*—Ayaz Sheikh
*Assistant Examiner*—Kaveh Abrishamkar

(57) ABSTRACT

A method, system and computer program product are disclosed for enhancing the security of a message sent through a network server from a client computer to a destination server running any computer platform. Credentials for authorizing a principal are obtained by the client computer from a validation center. The principal-authentication information is transmitted to the network server. The network server may use the principal-authenticating information to obtain permission data from the validation center for use in accessing the destination server. Also described is a method of providing a remote interactive login connection using the same method.

36 Claims, 23 Drawing Sheets

U.S. PATENT DOCUMENTS

| | | | |
|---|---|---|---|
| 5,875,296 | A | 2/1999 | Shi et al. |
| 5,884,312 | A | 3/1999 | Dustan et al. |
| 5,913,025 | A * | 6/1999 | Higley et al. ............... 713/201 |
| 5,923,756 | A * | 7/1999 | Shambroom ............... 713/156 |
| 6,092,194 | A | 7/2000 | Touboul et al. |
| 6,154,844 | A | 11/2000 | Touboul et al. |
| 6,198,824 | B1 * | 3/2001 | Shambroom ............... 380/279 |
| 6,606,708 | B1 | 8/2003 | Devine et al. |
| 6,657,956 | B1 | 12/2003 | Sigaud |

OTHER PUBLICATIONS

Kohl, J. and Neuman, C., The *Kerberos* Network Authentication Service (V5), Sep. 1993.
Schneier, Bruce, Applied Cryptography, 2nd ed, (1996), pp. 566-572.
Steiner, Jennifer G., et al., "*Kerberos*; An Authentication Service for Open Network Systems," Mar. 30, 1988.
Kohl, John T., et al., "The Evolution of the *Kerberos* Authentication Service," Spring 1991 EurOpen Conference, Tromso, Norway.
Gradient Technologies, Inc., Web Integration Strategies: Believe It Or Not—Gradient Technologies' WebCrusader, Apr. 1996, pp. 1-12.
Gradient Technologies, Inc., Developing Secure Web-based Java Applications, The Integration of Web Crusader and Net Dynamics, May 1997, pp. 1-16.
Gradient Technologies, Inc., Encryption Security In the Enterprise, Public Key/Secret Key, Jan. 1997, pp. 1-20.
InformationWeek, Spinning A Secure Web, Aug. 12, 1996 (4 pages)
Gradient Technologies, Inc., NetCrusader Product Data Sheet, NetCrusader's Distributed Services Product Line, Mar. 1997 (4 pages).
Gradient Technologies, Inc., NetCrusader Product Family Overview, Mar. 1997 (4 pages).
Gradient Technologies, Inc., NetCrusader Product Data Sheet, NetCrusader Commander, Mar. 1997 (4 pages).
Gradient Technologies, Inc., WebCrusader Product Data Sheet, WebCrusader Product Line, Mar. 1997 (4 pages).
Gradient Technologies, Inc., Web-based Applications Make the Grade at Penn State University, 1996 (2 pages).
MIT, Kerberos V5 Installation Guide (Release beta 7) , Sep. 11, 1996.
MIT, Kerberos V5 System Administrator's Guide (Release beta 7) , Sep. 10, 1996.
MIT, Kerberos V5 UNIX User's Guide (Release beta 7) , Sep. 10, 1996.
MIT, Kerberos V5 Application Programming Library, Sep. 10, 1996.
MIT, Kerberos V5 Data Encryption Standard Library draft, p. 1.
MIT, Kerberos V5 Implementer's Guide, Sep. 10, 1996.
Jaspan, Barry, Kerberos Administration System KADM5 API Functional Specifications, Sep. 10, 1996.
Jaspan, Barry, KADM5 Library and Server Implementation Design, Sep. 10, 1996.
Kamens, Jonathan I. , KADM5 Admin API Unit Test Description, Sep. 10, 1996.
Kamens, Jonathan I. , Open V*Secure Admin Database API Unit Test Description*, Sep. 10, 1996.
MIT, Kerberos V5 Installation Guide (Release 1.0) Dec. 18, 1996.
MIT, Kerberos V5 System Administrator's Guide (Release 1.0) , Nov. 27, 1996.
MIT, Kerberos V5 UNIX User's Guide (Release 1.0) , Dec. 18, 1996.
MIT, Upgrading to Kerberos V5 from Kerberos V4 (Release 1.0) , Dec. 18, 1996.
Ladd et al, Using HTML 3.2, JAVA 1.1 and CGI, Nov. 96, Que Corporation, Chapter 46, pp. 1047-1063.
Microsoft, "Microsoft Windows NT.TM. Server Version 4.0, A guide to Reviewing and Evaluating", Microsoft Corp., Aug. 1996, entire document. cited by examiner.
Yin, J., Automating the Remote Execution of Server Administrator CLI Commands, PowerSolutions, May 2002, pp. 50-54, entire article, ftp.jp.dell.com/app/2q02-Yin.pdf. cited by examiner.
Lawrence, R., "A survey of Process Migration Mechanisms", Dept. of CS, Univ. of Manitoba, May 29, 1998, entire article, www.cs.uiowa.edu/.about.rlawrenc/research/Papers/proc.sub.-mig.pdf. cited by examiner.
Trostle et al., "A Flexible Distributed Authorization Protocol", IEEE Proceedings of SNDSS '96, 1996.
McMahon, P.V., "SESAME V2 Public Key and Authorization Extensions to Kerberos", IEEE, 1995.

* cited by examiner

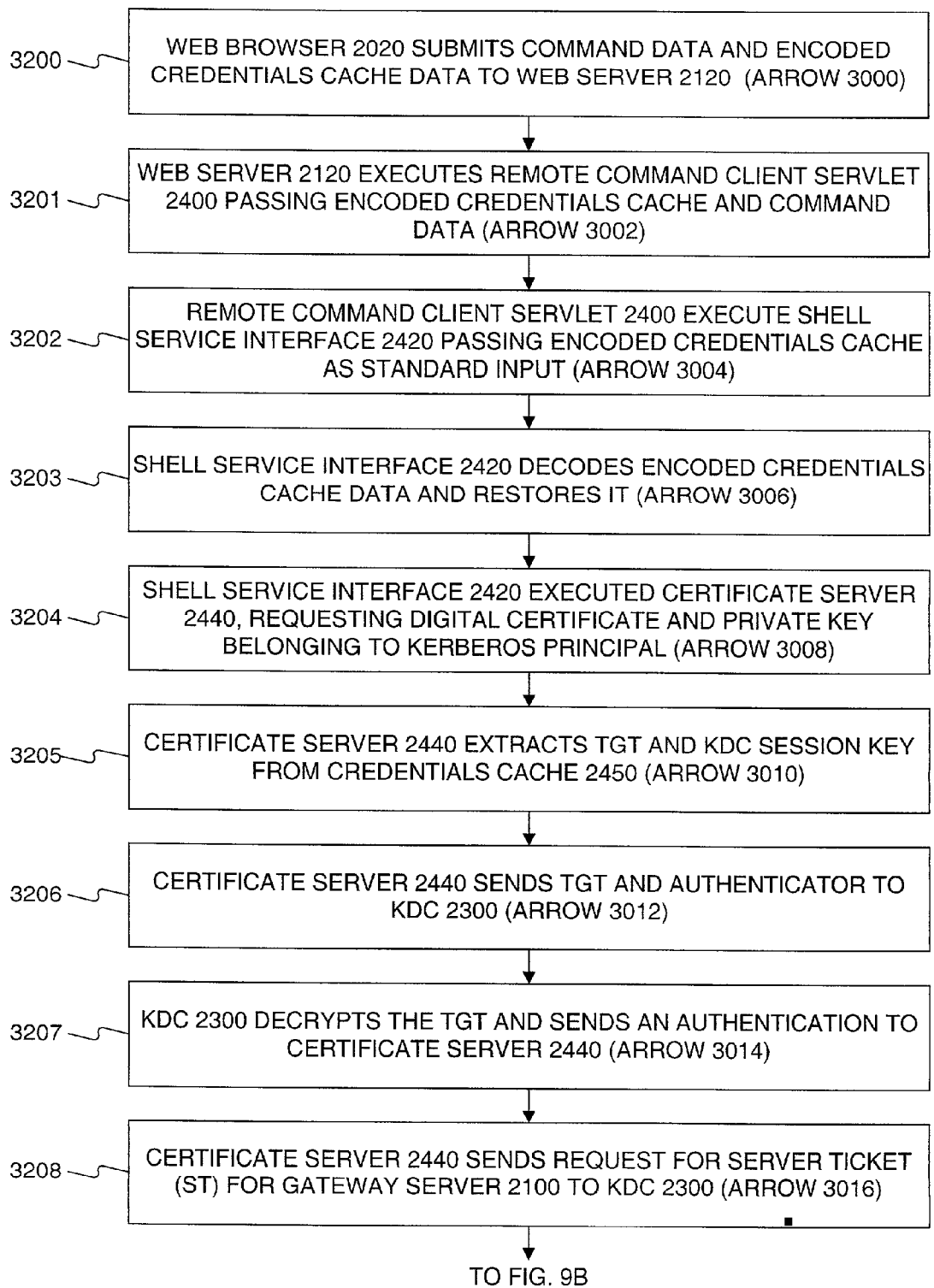

PLATFORM-NEUTRAL SYSTEM AND METHOD FOR PROVIDING SECURE REMOTE OPERATIONS OVER AN INSECURE COMPUTER NETWORK

CROSS-REFERENCE TO RELATED APPLICATIONS

This is a continuation-in-part of U.S. patent application Ser. No. 09/309,695, filed May 11, 1999, now U.S. Pat. No. 6,198,824 which, in turn, is a continuation of Ser. No. 08/799,402 filed Jan. 12, 1997, now U.S. Pat. No. 5,923,756, filed Feb. 12, 1997, and issued Jul. 13, 1999, both of which are expressly incorporated by reference herein.

FIELD AND BACKGROUND OF THE INVENTION

The present invention relates to improving the security of data transmission between computers using an insecure network, particularly to methods and systems for improving the integrity and security of messages transmitted from a client to a network server and then to a destination server or from the destination server to a network server and then to the client as part of a distributed computer system.

A distributed computer system comprises multiple distinct computers, which are interconnected. One simple example of a general-purpose distributed system is a networked system comprising several workstations and servers interconnected through a network. Networks are popular because they allow organizations to share information and resources. Furthermore, in a networked system, if one computer breaks, or "crashes," the others may continue to operate.

The type, cost and reliability of the manner of interconnection can be important considerations in networked systems. Large networks over relatively short distances typically use local area networks (LAN) such as an Ethernet or a Token Ring, which permit communications between a number of different computers on one or more wires. The use of modems allows computer networks to be created over a larger area, because the connections can be made over data links such as telephone lines. Wide area networks (WAN) typically use a combination of fiber optic and copper wire telephone lines as well as microwave links and satellites to connect several smaller LANs. Networks of networks are often referred to as internetworks.

Computer networks, particularly internetworks, can be vulnerable to security breaches. The degree of security of each component in the network differs, in part because each entity may be protected by varying layers of physical and operational security. Furthermore, each component or network in an internetwork may be owned or controlled by different organizations whose security practices differ widely. The interconnections between the computers may be similarly insecure. Since some part of the network may use physically insecure links, such as telephone lines or microwave links, hackers and interlopers may eavesdrop or intercept communications over the telephone line and modify them according to their wishes or copy them for later use. Interlopers who copy login and/or command information have the potential to use that information to gain access to other computers on the network.

Network security is typically based on at least three general concepts. For every request to do an operation, such as execute a diagnostic routine or perform a remote login, the network 1) authenticates the request; 2) controls access via access control criteria; and, 3) audits every request to detect unauthorized uses.

Authentication is the process of verifying the identity of a user initiating a request. One common example of authentication is the use of a password at time of login. Upon receiving a username and password from a user, a host computer retrieves the password associated with the username in a password file, and if the supplied password matches the password associated with that username, the host computer allows access. In the situation just described, however, it is assumed that the user and host are communicating over a secure connection; otherwise, interlopers could intercept the communications from the user to the host and steal the username and password information. The interloper could then illegally access the host at a later time by using the stolen username and password information.

In a networked system comprising multiple interconnected computers, a first computer may request service from a second or destination server through an intermediate server. This first computer is typically called a client. In order to receive service from a destination server, the client must begin by authenticating itself to the destination server. However, because the client may be communicating to the destination server over an insecure line, the client cannot simply send a password in the clear. Instead, the client and the destination server may engage in a multiple query and response exchange, constituting an authentication process, which will convince the destination server that the requesting client is an authorized user.

Encryption-based authentication processes that can be used to so authenticate a client to such a server are known generally. Such authentication processes can be based on public-key or secret-key encryption systems. In a typical secret-key authentication scheme, each authorized party possesses a secret key, which is known only by the party and is registered with a trusted third party, or authentication server. The authentication server maintains a list of registered parties and secret keys and, therefore, must be physically secure. By contrast, in a public-key authentication system, each party has a public key and a private key. The public key is posted; the private key is known only to the party.

One example of a secret-key based network authentication system is the trusted third-party authentication service called Kerberos. Network services and clients requiring authentication register with a Kerberos security server and receive a secret key, where the key (or a pass phrase from which it can be derived) is known only to a principal and the Kerberos security servers.

A Kerberos principal is an identity to which credentials can be assigned and on behalf of which certain computer operations may be performed. A principal can be associated with a role or function belonging to a human computer user, and an individual human user can have multiple principal identities corresponding to multiple function roles for that user.

A principal may also be associated with a software program running on a computer. In this case, the principal may be used to authenticate the identity of that computer to a human user or another software program running on a different computer. The principal may also allow or deny access to certain operations on the computer on which the software program is executing.

In all cases, the physical manifestation of a principal comprises an entry in one or more security databases including the principal's name, secret key, and other data.

Kerberos also generates temporary session keys, which can be used to encrypt messages between two registered Kerberos principals. A typical Kerberos software package is Kerberos Version 5 from Project Athena at the Massachusetts Institute of Technology (MIT). The Kerberos authentication scheme also is discussed in J. Kohl and C. Neuman, The Network Authentication Service (V5), Request for Comments: 1510 (September 1993). Kerberos and other trusted third-party private authentication schemes can allow for secure access between two principals.

Other known systems have been developed to address network security issues. For example, the Secure Sockets Layer (SSL) protocol has been designed specifically to enable entities to authenticate themselves to each other and to protect the information being transmitted across the Internet by using encryption. Both the client and the destination server must support SSL. SSL is application-independent and operates above the Transport layer, meaning that it can operate under application protocols such as HTTP, File Transfer Protocol (FTP), telnet, Network News Transport Protocol (NNTP), and Simple Mail Transport Protocol (SMTP). SSL supports several cryptographic algorithms to support the authentication and encryption functions between the client and the server.

A current trend in distributed system development is the concept of managed hosts. In a managed host system, a client will access a network server and, via the network server, request access to a another server, which may be referred to as a remote host or a managed host. Likewise, multiple remote hosts or managed hosts may be accessed by a client via a network server. In larger networks, the network server may be acting as a gateway and proxy for a large number of clients to each access a large number of destination servers. In order for the transaction from a client to a destination server to be secure, both the transactions between the client and the network server and the transactions between the network server and the destination server should be secured by a network authentication and encryption process.

In a certificate-based authentication scheme, all entities that wish to authenticate to one another must register with a third party called a certificate authority. The certificate authority verifies the identity of the registering party and issues certificates which the parties can then use to authenticate themselves to other registered parties. There are many certificate authorities offering suitable certificates of authentication including, for example, those provided by Verisign, Baltimore Technologies, and RSA Laboratories.

There are a number of problems associated with simply using a certificate-based authentication process to secure the transactions between the client and network server and those between the network server and the destination server. Use of this system, for example, would require that the network server and all destination servers possess certificates ultimately traceable to the same top-level certification authority. Furthermore, each individual user of a client system must be issued a client certificate. If the client certificates were stored on the individual workstations, the client would be restricted to using only particular workstations. If the client certificates were stored on a portable media, such as diskettes, they would be subject to loss or theft, decreasing the security of the overall network system. Moreover, client workstations may be any one of a number of different hardware devices, such as PCs or Macintosh, running a variety of different operating systems, such as UNIX or Microsoft Windows®, and there is no single medium supported by all the varieties of clients. In summary, use of a certificate authentication scheme between the client and the network server would be administratively difficult to support.

When Kerberos authentication for all transactions is used, each client workstation is required to possess the software necessary to communicate with the key distribution center (KDC). This approach encounters problems including that of providing many different versions of the software to support the many varieties of clients.

If one authentication scheme is used to secure transactions between the client and the network server, while another authentication scheme is used to secure transactions between the network server and the destination server, then in transactions between the client and the destination server, the network server must act as a proxy for the client, and it may sometimes be undesirable to require the network server to perform client authentication. Since, by using two different authentication schemes, the client would not be authenticating itself to the destination server directly, the network server needs to act as if it has the identity and memory of the client server.

In server-to-server transactions, the user typically has directly logged on to the network server using a shell or command interpreter program. The shell program creates records on the network server that maintain a record of the user's identity and use (i.e. time and date). As long as the user is logged on, the shell logon program exists. In contrast, in a client-to-managed host transaction, the shell or command interpreter program is active on the client computer, but not on the server. The network server, instead, is interfacing with a KDC, or authentication server, on behalf of the client. To do this, a network server configured as a World Wide Web server creates and executes transient processes (such as when an HTTP Common Gateway Interface request is executed) or utilizes an extension to the World Wide Web server (such as a servlet) to query the KDC. Common Gateway Interfaces and servlets are often used interchangeably. These temporary processes must assume in some sense the identity of the user for the length of the transaction. Once their functions are complete, however, the transient processes terminate and disappear or the World Wide Web server extensions become quiescent and available for another use, thus resulting in the loss of any identity or session state data they may have acquired.

When a network server does not maintain any information on a client once it has finished processing a request by the client, the server is described as stateless. A stateless file server avoids retaining client information by deriving information about files and positions within files from the request itself. A stateful server (e.g., one that stores file information in volatile memory) loses the information when the server crashes. In addition, if the client fails, the server may be unaware that the client is no longer using the space allocated to retain information needed for the transactions and may be unable to reclaim the space. In contrast, following the crash of a client or server, the stateless server need only respond to the last fully self-contained request from the client to continue the operation. In a UNIX operating environment, the UNIX processes (e.g. daemons) are sometimes stateful. Individual transient processes, however, are not persistent and, therefore, cannot maintain long-term state information internally.

There is a need, therefore, for a method of and system for increasing security of transactions involving multiple networked computers, and for increasing security of transactions involving a client that sends commands to a managed host via an intermediate server over a non-secure network such as the Internet.

There is also a need for a method of and system for increasing security of transactions involving a client, a network server, and a managed host, where the client is not restricted to one of a limited subset of devices or operating systems because of interoperability or administration concerns.

Moreover, a need exists for a method of and system for increasing security of transactions involving a client, a network server, and a managed host, where the increased security is attained by using an SSL protocol for communications between the client and the network server, a Kerberos authentication system is used to authenticate the identity of the client to the managed host and the managed host to the client, and the client communicates with the managed host through an insecure network connection such as the Internet.

Needs also exist to allow many varieties of clients to communicate with a destination server via a network server over an insecure network connection using authentication protocols and to allow transmission of data or commands over an insecure computer network from a client to a destination server via a network server.

Another desire is for a system and method to allow necessary client information to pass to the network server with each transaction so that the network server may access the destination server on behalf of the client.

SUMMARY OF THE INVENTION

Systems and methods consistent in this invention increase security of data transmissions between a client, a network server and a managed host using an insecure network, such as the Internet. After establishing a secure network connection between a client and a network server, a secure authentication protocol is used to obtain at the network server client-authenticating information from a KDC. The client-authenticating information is transmitted from the network server to the client and erased from the network server. The client-identifying information is transmitted back to the network server from the client along with a message for the destination server. Credentials are obtained to access the destination server from the KDC over the insecure network using the secure authentication protocol. At the destination server, the identity of the client accessing the destination server is validated using the message. The destination server is accessed with the message if the client's authorization is properly validated.

Establishing the secure network connection between the client and the network server can use the Secure Sockets Layer (SSL) protocol. Obtaining client-authenticating information and securing the network connection between the network server and the destination server can use the Kerberos authentication protocol. Access to the destination server by authenticated users can be controlled by an access control list (ACL) on the destination server.

A computer system consistent with the present invention, comprises a first computer server, such as a client, that issues commands over a network connection, and a second computer server, such as a network server, responsive to the first server and for accessing a fourth server on behalf of the client. The first and second servers can communicate via the same network operable connection therebetween. The second server also has system (or service) capable of generating an authentication request on behalf of the first server. A third computer server, such as a key distribution computer, receives the authentication request, responds to the request to authenticate the identity of the first server, and sends authentication indicator information regarding the first server back to the second server via the network. A fourth computer server, such as a managed host, is also interconnected to the network for receiving and executing the command from the first server if the network server transmits the authentication indicator information to the managed host and if the first server is authorized to access the fourth server.

Since many managed hosts do not run on a UNIX platform, these managed hosts are often not equipped to run Kerberos server-side authentication services. These non-UNIX managed hosts, may comprise, for example, computers running Microsoft Windows®. Therefore, the above methods and systems may be extended to support secure remote operations which are platform-neutral with respect to the managed host.

Accordingly, a method of enhancing the security of a message sent by a principal from a client computer through a network server to a destination server is described. The method comprises the step of obtaining credentials by the client computer for authorizing the principal from a validation center. A secure connection for exchanging data between the client and the network server is established. The principal-authenticating credentials and the message are transmitted from the client computer to the network server. The network server transmits the principal-authenticating credentials to the validation center.

Permission data for the network server are transmitted from the validation center to the network server based on the principal-authenticating credentials. The identity of the principal and the authorization of the principal to access a digital certificate are verified in the network server. A digital certificate is retrieved by the network server based on the verification. A secure connection is established for exchanging data between the network server and the destination server based on the digital certificate. The message is transmitted from the gateway server to the destination server and one or more commands may be executed based on the message.

A similar method may be used to provide a remote interactive login connection for a principal from a client computer through a network server to a destination server. This method comprises the step of obtaining credentials for authorizing the principal from a validation center and establishing a secure connection for exchanging data between the client and the network server. The principal-authenticating credentials are transmitted from the client computer to the network server and then from the network server to the validation center.

The validation center transmits permission data for the network server to the network server based on the principal-authenticating credentials. The network server verifies the identity of the principal and the authorization of the principal to access a digital certificate. Based on this verification, the network server retrieves a digital certificate and a matching private key. A secure connection is established for exchanging data between the network server and the destination server based on the digital certificate. A command interpreter is executed in the destination computer wherein the command interpreter may execute commands sent by the client computer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIGS. 9A-9D are flow charts showing the operation of the system of FIG. 8 in accordance with the present invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

A method and apparatus useful for implementing the present invention will first be discussed in general with reference to FIGS. 1, 2, and 3.

Figure 1:
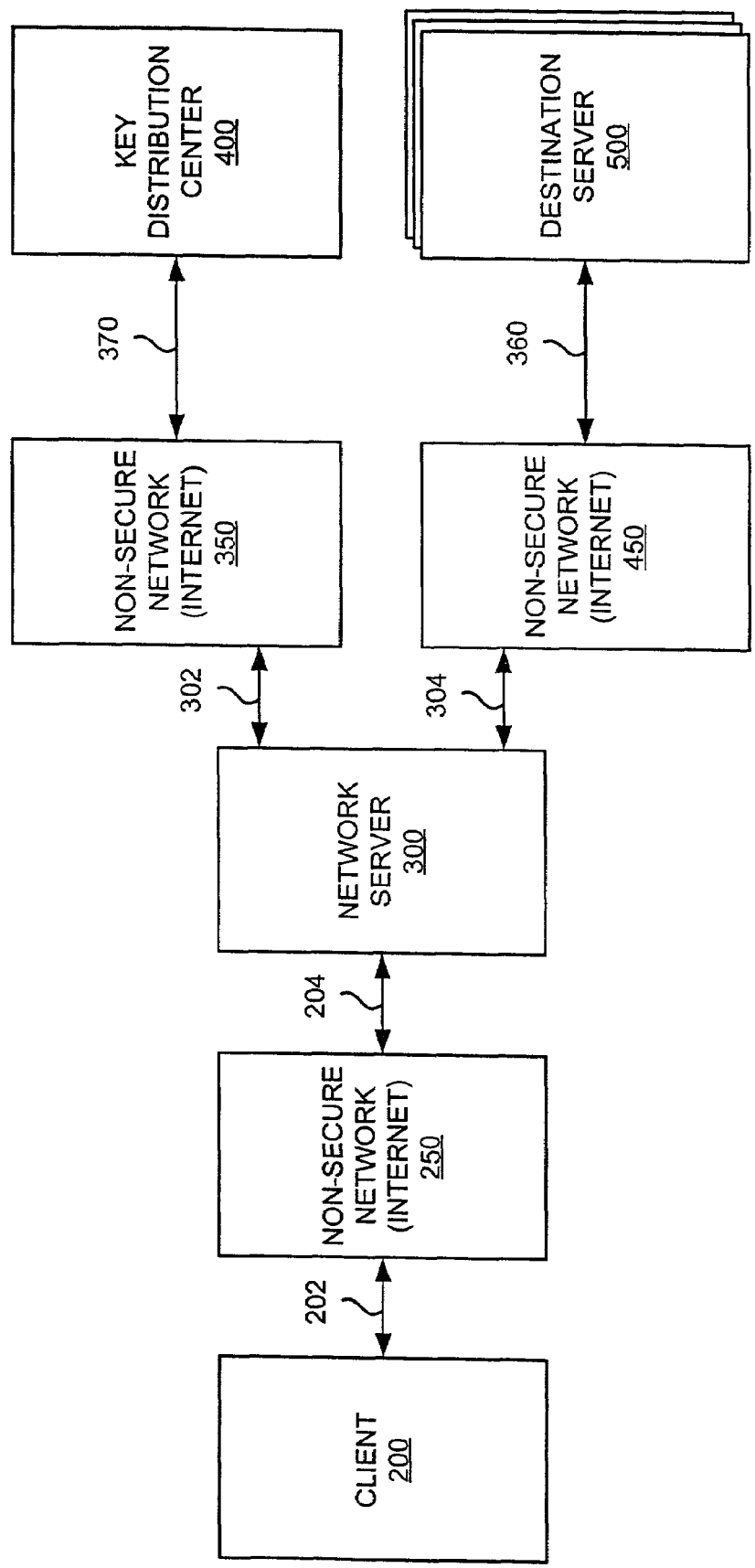
FIG. 1 is a block diagram of a system that may be used to implement the present invention.

As shown in FIG. 1, the present invention uses a client workstation (indicated generally as client 200), which can be, by way of example only, a personal computer (PC) running Microsoft Windows95®, Windows98®, Windows2000®, or WindowsNT®, an Apple Macintosh, or a UNIX workstation. Client 200 is connected to an insecure network 250 (such as the Internet) via data link 202. A network server 300, which communicates with client 200 along insecure network connection 250, can, by way of example only, be a UNIX server. Network server 300 is connected to insecure network connection 250 via data link 204 as well as a second insecure network connection 350 via suitable data link 302 and a third insecure network connection 450 via suitable data link 304. Destination server 500 communicates with network server 300, also through the insecure network connection 450, via data link 360. Destination server 500 can be, by way of example only, a UNIX server. A key distribution center (KDC) 400, which validates requests to establish proper identity, is likewise in communication with network server 300 through data link 370 and insecure network connection 350.

It is understood that FIG. 1 describes an exemplary network where each of the hardware components may be implemented by conventional, commercially available computer systems. Data links 202, 204, 302, 360, and 370 can be any suitable communications medium, such as, for example, data links using dedicated lines or modems. Also, by way of example only, each computer or server can operate using an operating system such as UNIX.

Additionally, network server 300 and KDC 400 may contain information that can be used to compromise the security of the system, therefore, physical access to network server 300 and KDC 400 should be adequately controlled.

1. Establishing a Secure Network Connection Between a Client and a Network Server In the embodiment of FIG. 1, client 200 and network server 300 communicate via insecure network 250. Client 200 is connected to insecure network 250 via data link 202 which, by way of example only, may be a TCP/IP network connection. Network server 300 is connected to insecure network 250 via data link 204 which also may be a TCP/IP network connection. To enhance message privacy and integrity, client 200 and network server 300 preferably communicate using a secure authentication and/or encryption protocol to establish a secure network connection between client 200 and network server 300. Any suitably reliable publicly available authentication protocol may be used, provided that such protocol is capable of successfully proving the identity of network server 300 to client 200 to thereby result in confidence on the part of client 200 that future communications are with network server 300 and not some impersonating entity. The authentication protocol preferably also produces a session key that is known only to client 200 and network server 300 and which can be used to encrypt subsequent transactions between client 200 and network server 300. One example of such an authentication protocol that has been developed specifically for use with TCP/IP Internet connections is the publicly available Secure Sockets Layer (SSL) protocol, Version 3.0, developed by Netscape Communications Corporation.

Figure 2:
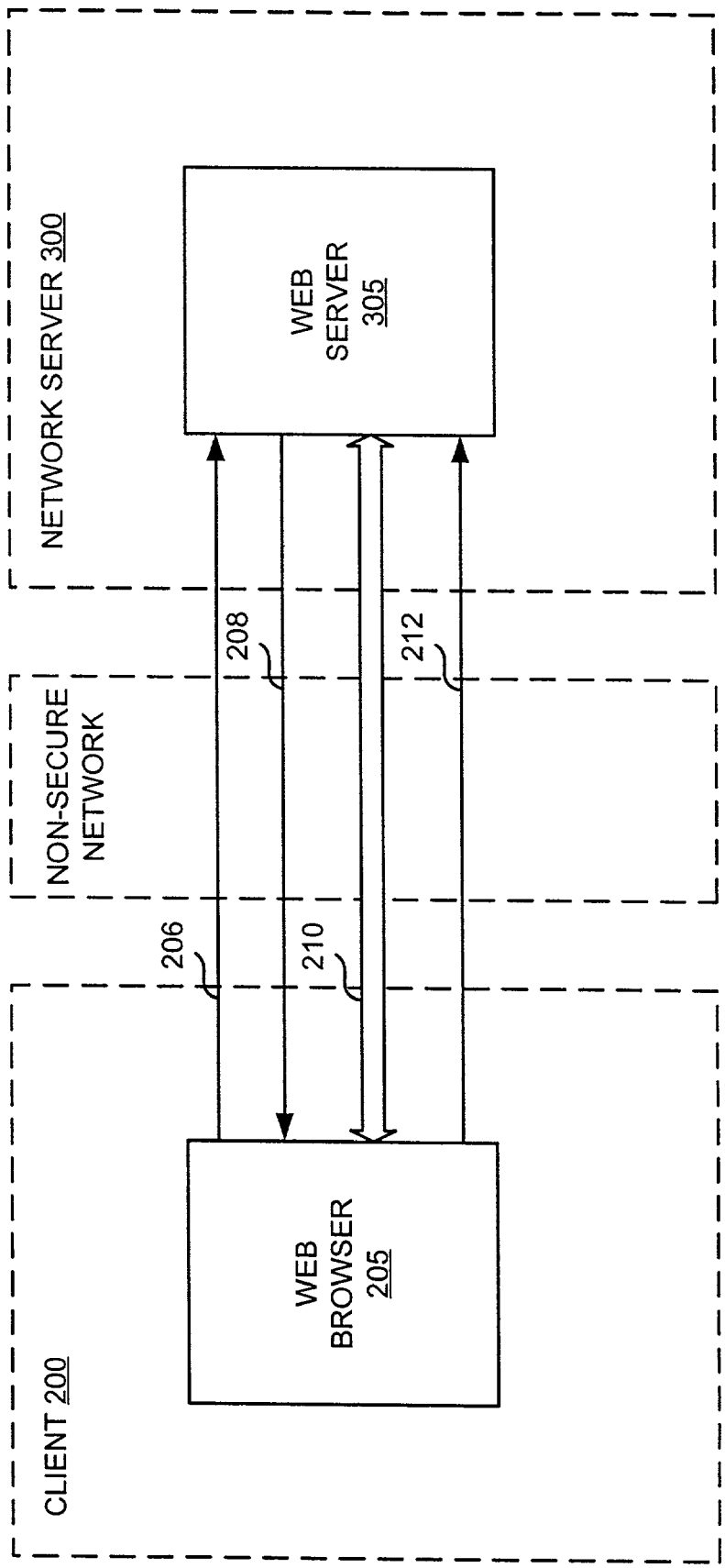
FIG. 2 is a more detailed block diagram of the client and network server of FIG. 1.
Figure 3:
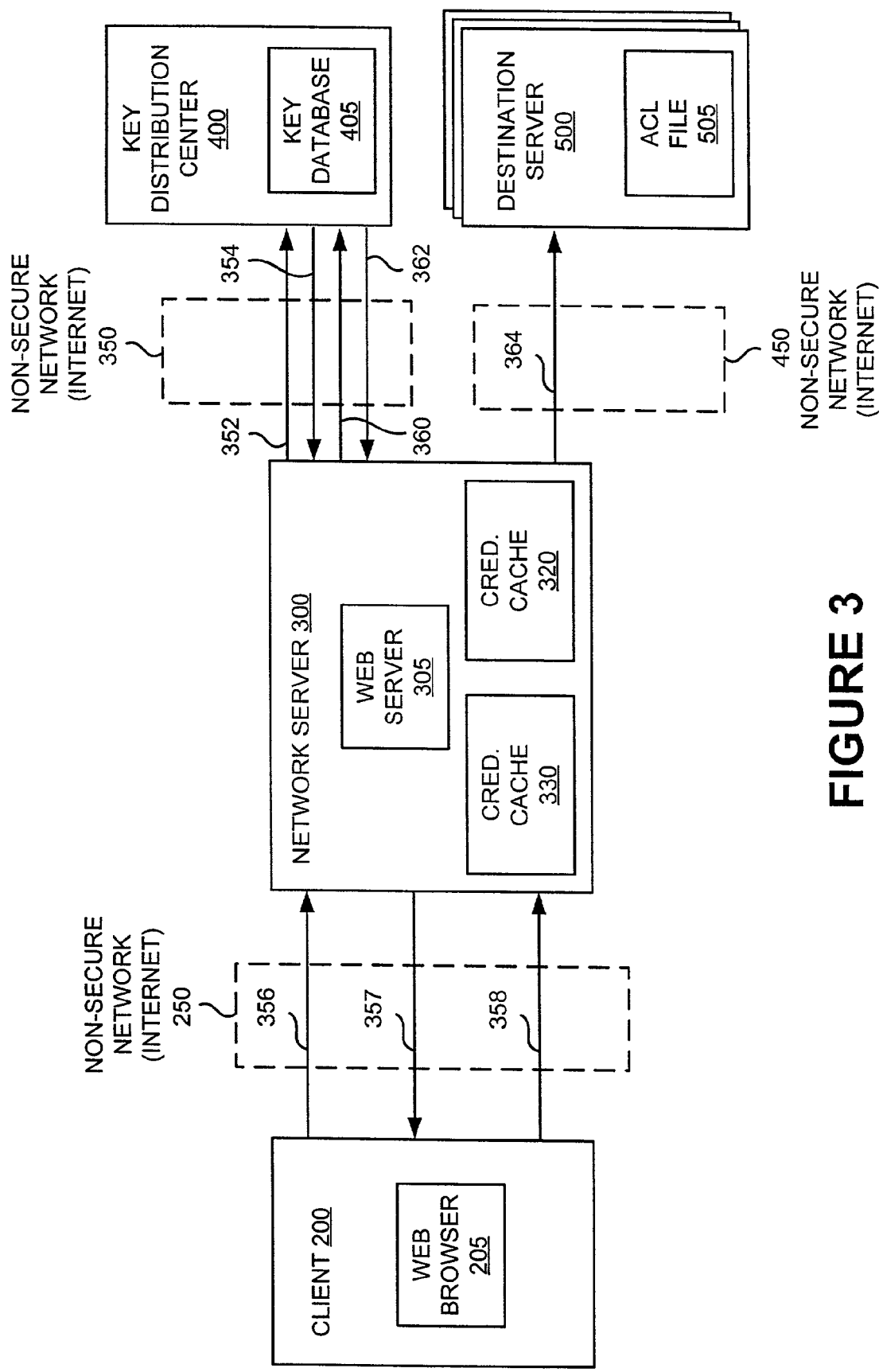
FIG. 3 is a more detailed block diagram of the client, network server, key distribution center, and destination server of FIG. 1.

FIG. 2 shows in more detail the manner in which communications can be carried out between client 200 and network server 300. As shown in FIG. 2, client 200, which can include a web browser 205, initiates a request for authenticated secure access to the web server 305 of network server 300 as indicated by arrow 206. Client 200 may be operating any publicly available web browser software package such as, for example, Netscape Navigator. Because the request may be transmitted in the clear across an insecure communications link, the request at 206 should not contain login or password information.

Web server 305 of network server 300 responds to the request at 206 by transmitting information back to web browser 205 that will be used to authenticate the identity of network server 300 to client 200 and support generation of additional information which will be used to encrypt future transmissions between client 200 and network server 300. If, for example, an SSL transaction is employed in the system of FIG. 2, web server 305 sends web browser 205, as indicated by arrow 208, a certificate that includes network server 300's public key and an identifier indicating a cryptographic algorithm supported by network server 300. To properly establish the connection, network server 300 and client 200 perform a handshake process indicated at arrow 210 which, if successfully completed, provides both client 200 and network server 300 with a session key known only to network server 300 and client 200. This session key can be used to encrypt future transactions between network server 300 and client 200. In the handshake process of SSL, for example, client 200 creates a session key, encrypts the session key using one of the cryptographic algorithms indicated by network server 300 in the certificate and the public key sent by network server 300, and sends the encrypted session key to network server 300. After receiving the encrypted session key, network server 300 authenticates itself to client 200 by decrypting this session key and returning to client 200 a message encrypted with the underlying session key.

When the handshake indicated at arrow 210 is successfully completed, client 200 and server 300 continue to use the session key to encrypt future transactions. As depicted generally in FIG. 1, the connection 202 and 204 between client 200 and server 300 are therefore protected to the degree of security achieved by the encryption algorithm.

Once an appropriately secure network connection is established between client 200 and network server 300, server 305 now sends a login form to client 200, and as indicated at 212, client 200, returns login data comprising the name and password of a Kerberos principal to web server 305.

2. Authenticating a Client to a Key Distribution Center and Obtaining Client-authenticating Information from the Key Distribution Center FIG. 3 depicts, by way of example only, the process of obtaining client-authenticating information from KDC 400 over an insecure TCP/IP network 350, such as the Internet, that will later be used to establish that network server 300 is acting on behalf of the Kerberos user principal. Other publicly available secure authentication protocols may be used. The security of the system, however, may be enhanced further by implementing an authentication protocol that incorporates the use of timestamps. Timestamps can be used to restrict replay attacks, or the recording of some portion of an authentication protocol sequence and use of old messages at a later date to compromise the authentication protocol.

One example of a publicly available authentication protocol using timestamps is Kerberos Version 5 developed by Project Athena at MIT. The preferred embodiment as described below assumes the use of Kerberos Version 5. The details of this authentication procedure follow.

Once web server 305 receives encrypted login information from web browser 205 as indicated by arrow 356, network server 300 passes the Kerberos user principal name of client 200 and a request for a permission indicator to KDC 400 over insecure network 350 as indicated by arrow 352. Upon receiving the request for a permission indicator at 352, the KDC 400 generates a KDC session key for protecting transactions between network server 300 and KDC 400.

Using client 200's Kerberos user principal name received at 352, the KDC 400 extracts client 200's secret key from key database 405, which stores secret keys used by KDC 400 and other properly registered clients. Using client 200's secret key, the KDC 400 then encrypts one copy of the KDC session key and creates a permission indicator, which would typically include by way of example only, a timestamp, client 200's user name and network address, and another copy of the KDC session key. This permission indicator will be used later by client 200 to authenticate itself to KDC 400. The permission indicator is encrypted with KDC 400's private key, which is known only to KDC 400; KDC 400, therefore, can later decrypt the permission indicator to verify its authenticity.

KDC 400 then sends both the encrypted session key and the permission indicator back to the network server 300 as indicated at arrow 354. Network server 300 receives the encrypted information from KDC 400, and decrypts the KDC session key using client 200's user key. In one embodiment, the client user key is a one-way hash of client 200's password and other information, so the network server is able to derive the user key by hashing client 200's password. Both the permission indicator and the KDC session key are stored in credentials cache 320. Web server 305 encodes the contents of the credentials cache 320 and, as indicated at arrow 357, sends the contents of the credentials cache 320 to web browser 205. The authenticating information that may have resided in the network server 300 is then erased or otherwise deleted. Thereafter, in order for client 200 to continue with the transaction, client 200 will have to refresh the memory of server 300. If a hacker or interloper managed to gain access to network server 300 while information was stored in credentials cache 320, only the permission indicator and session key could be obtained, because the Kerberos password is destroyed after being used. This information would be of limited value, however, because the permission indicator, in the preferred embodiment, would contain a date/time stamp and would become worthless after a specified period of time, usually relatively short, has elapsed.

3. Sending a Command to a Destination Server

Now that it has the encoded credentials cache information from cache 320, client 200 can send this cache information along with a message, such as a command ultimately intended for destination server 500, to the network server 300 as indicated at arrow 358. Network server 300 decodes the encoded credentials cache information and stores the permission indicator and KDC session key in a credentials cache 330. Although this credentials cache 330 is not the same as credentials cache 320, which as described above, the data therein are the same. In actuality, the information could be stored in the same location on the same physical storage device, although as a practical matter this is highly unlikely.

As indicated at arrow 360, network server 300 now sends the permission indicator encrypted by the session key to KDC 400, along with an authenticator and a request to access destination server 500. This authenticator includes the Kerberos user principal name and a time stamp, encrypted using the KDC session key. KDC 400 decrypts the permission indicator using the KDC secret key to obtain the KDC session key and a validity period. If the KDC 400 decrypts successfully, the KDC is assured that the permission indicator is the same one that it issued earlier. The KDC 400 then uses the KDC session key to decrypt the authenticator to obtain the Kerberos user principal name and a time stamp. If the time stamp is within the validity period, the KDC 400 generates an access indicator. The access indicator typically would include the Kerberos user principal name, a validity period, and a server session key for use between network server 300 and destination server 500, all of which has been encrypted with the private key of the destination server 500. KDC 400 then sends to network server 300 the encrypted access indicator, and a copy of the server session key encrypted using the KDC session key, as indicated at arrow 362.

Thereafter, network server 300 decrypts the copy of the server session key that is encrypted using the KDC session key. Network server 300 then encrypts the message or command, using the server session key and, as indicated at arrow 364, sends the encrypted message along with the access indicator and a new authenticator to destination server 500 via insecure network 450. Destination server 500 uses its own private key to decrypt and obtain the server session key.

By using the server session key, known only to destination server 500 and the network server 300, the authenticity of the identity of client 200 can be validated at destination server 500. The destination server 500 can then trust the integrity of the message, such as a command, from client 200, thereby permitting access to server 500 if validation is correct. Destination server 500 can compare the identity of client 200 to a list of access control criteria that can be stored in ACL file 505 in destination server 500.

Figure 4:
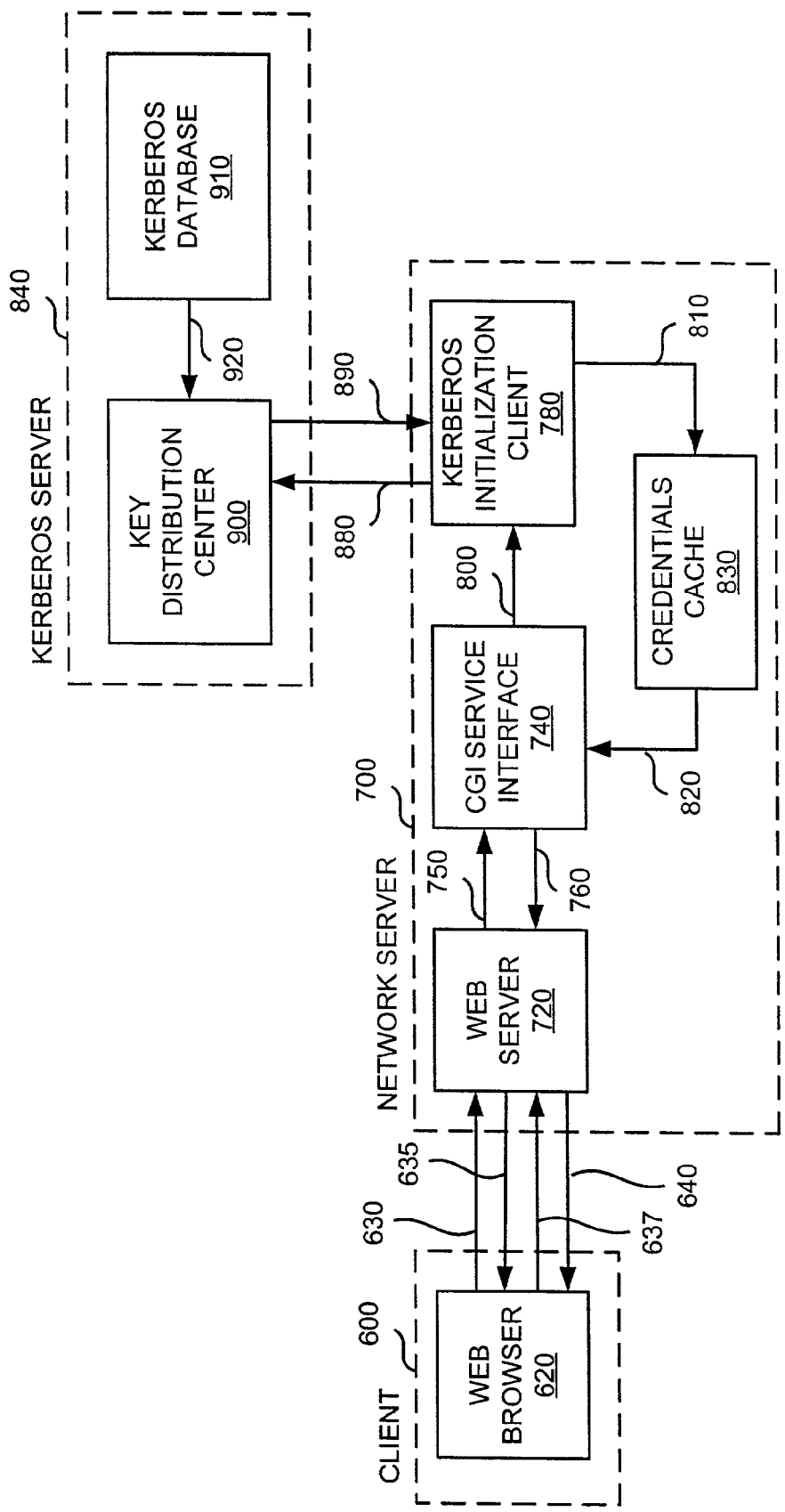
FIG. 4 is a block diagram of another system that may be used to implement the present invention.

A more detailed description of a method and apparatus useful for implementing the present invention, in particular an embodiment using a Kerberos authentication process, is depicted in FIGS. 4 through 7. FIG. 4, in conjunction with the flowchart of FIGS. 5-5a, describes the details of a login process. Once login has been properly achieved, FIG. 6, in conjunction with FIGS. 7-7b, describes the details of how a command is issued from a client to a destination server such as a managed host.

1. The Login Procedure

With reference now to FIG. 4, client 600, indicated generally by dotted lines 610, includes web browser 620. Web browser 620 communicates with network server 700, which is indicated generally by dotted lines 710. As will be further described below, arrows 630, 635, 637, and 640 indicate the exchange of information between web browser 620 and web server 720 of network server 700. Web server 720 exchanges information with a first Common Gateway Interface (CGI) Service Interface 740, as indicated by arrows 750 and 760. For purposes of the present invention, CGIs and servlets may be used interchangeably. CGI Service Interface 740 can be a process forked by web server 720. As indicated by arrows 800, 810, and 820, CGI Service Interface 740 in turn exchanges information with Kerberos Initialization Client 780, which can be a process forked by CGI Service Interface 740. Network Server 700 further includes credentials cache 830, which receives information from Kerberos Initialization Client 780 as indicated by arrow 810 and sends information to CGI Service Interface 740 as indicated by arrow 820.

As shown by arrows 880 and 890, network server 700, and in particular the Kerberos Initialization Client 780, communicates with a Kerberos server 840, indicated generally by dotted line 860. In this embodiment, Kerberos server 840 includes a KDC 900, which has access to Kerberos database 910 as indicated by arrow 920. Kerberos Server 840 can be a group of processes running on the same computer as the network server 700, or on a different computer.

Figure 5A:
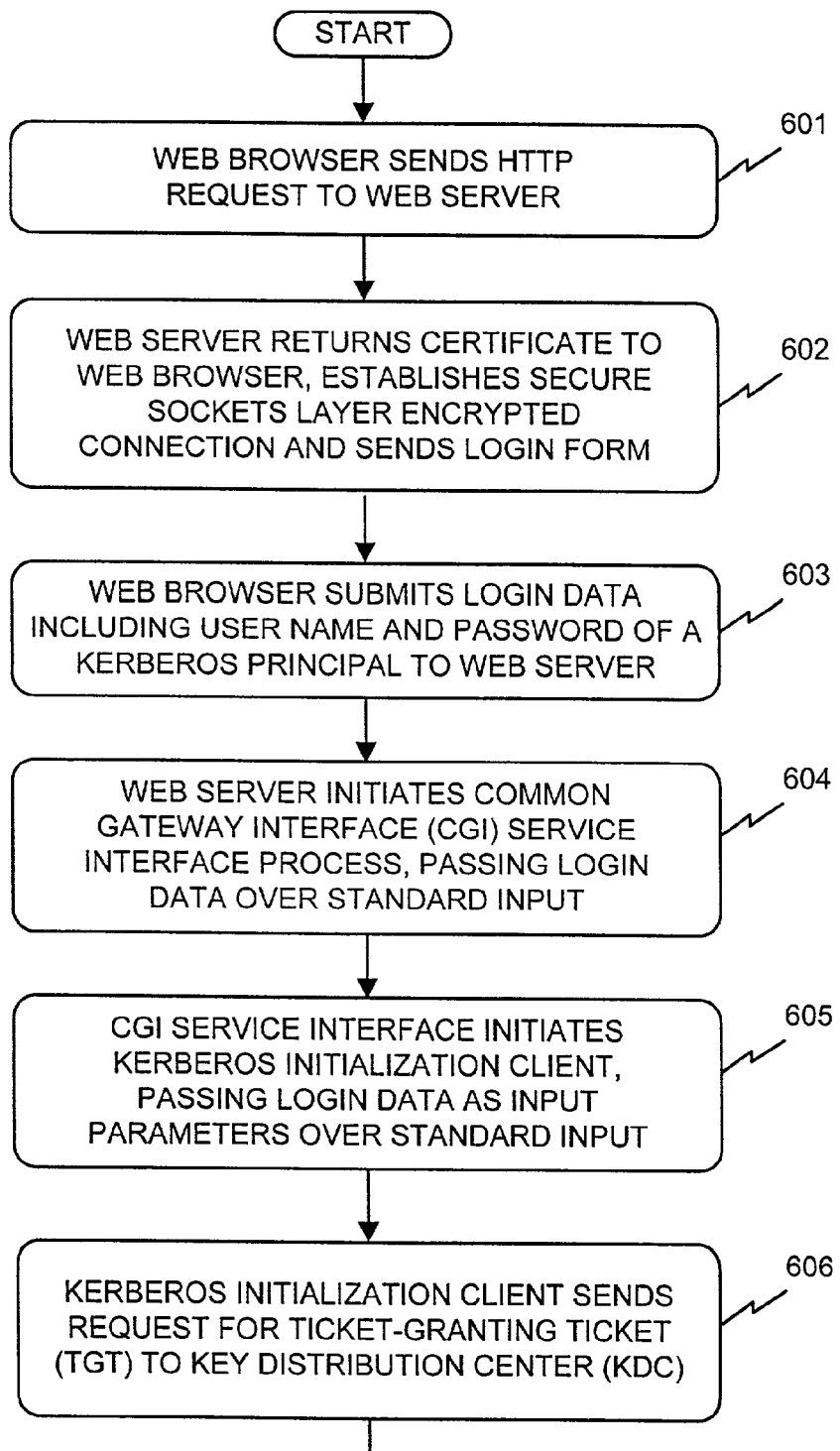
FIGS. 5a-5b are flow charts showing the operation of the system of FIG. 4 in accordance with the present invention.
Figure 5B:
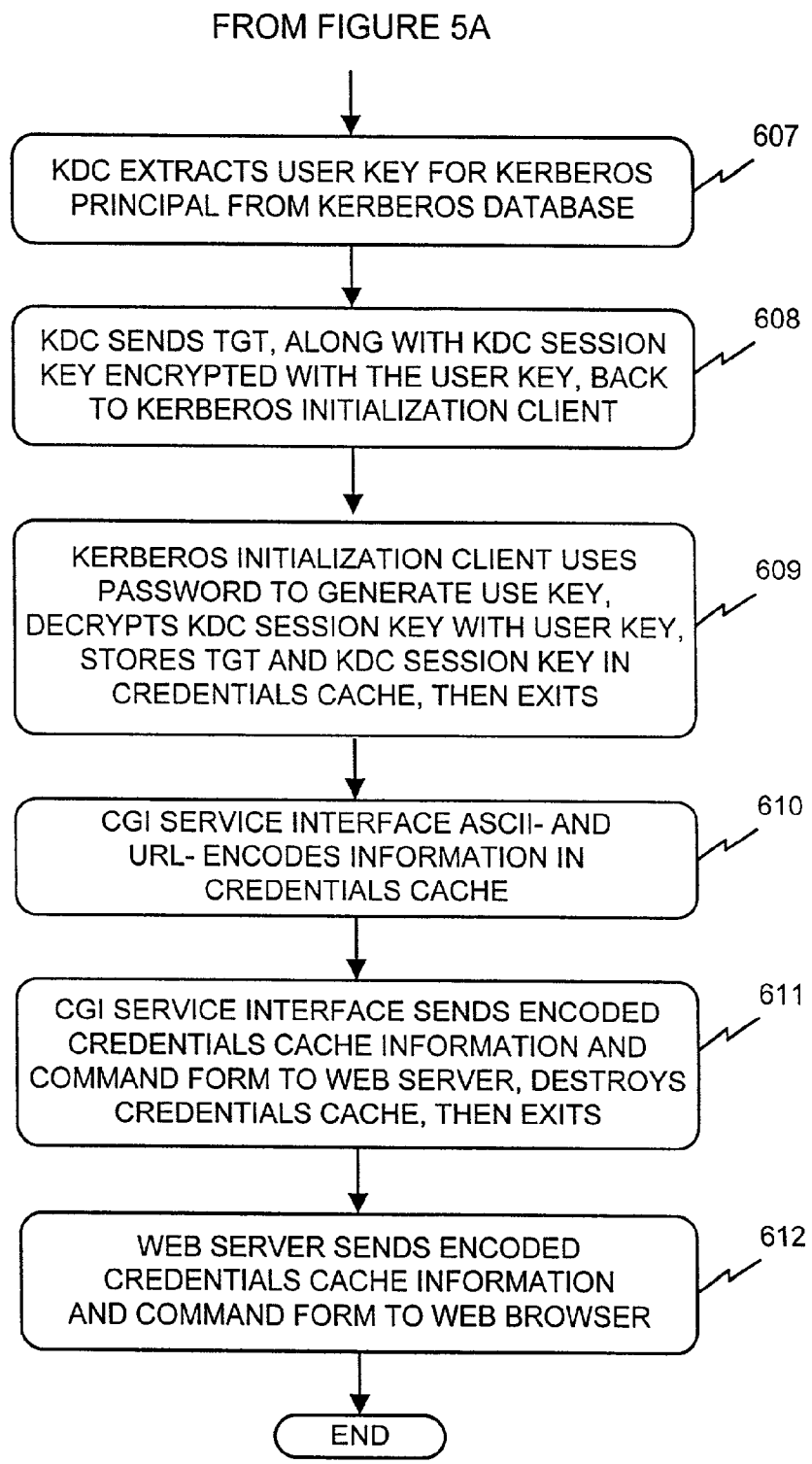

The flowchart of FIGS. 5-5a further describe how the system of FIG. 4 accomplishes the login procedure. The term "Arrow" used in the stepes of the flowchart refers back to the corresponding numbers in FIG. 4. Web browser 620 sends a request for an SSL connection to web server 720. [Step 601]. Web server 720 responds with a certificate to web browser 620. This certificate includes the network server's public key and a list of one or more cryptographic algorithms that the network server supports and, by way of example only, may resemble an ITU X.509 standard certificate. Web server 720 also establishes a Secure Sockets Layer (SSL) encrypted connection with Web browser 620, and sends a login form to browser 620. [Step 602].

In response, web browser 620 submits login data back to web server 720 that would include, in this example, the user name and password of a Kerberos principal. [Step 603].

Web server 720 executes Common Gateway Interface (CGI) Service Interface 740. The login data are passed from web server 720 to CGI Service Interface 740 over a standard input. [Step 604]. The CGI Service Interface 740 process is a transient process which passes login information to the Kerberos Initialization Client 780. More specifically, the CGI Service Interface 740 executes the Kerberos Initialization Client 780. Login data are passed as input parameters and over standard input to the Kerberos Initialization Client 780 from CGI Service Interface 740 via 800. [Step 605]. The Kerberos Initialization Client 780 sends a request for a ticket-granting ticket (TGT) to KDC 900 of Kerberos Server 840. [Step 606].

In other words, the Kerberos Initialization Client 780 initiates a request to the KDC 900 for a permission indicator, here, for example, the TGT. As already explained above, the permission indicator includes information that will be used during future transactions with KDC 900 for proper authentication.

KDC 900 extracts the user key for the Kerberos principal from Kerberos database 910. [Step 607]. In the Kerberos application, client 600's secret key is preferably a secure one-way hash of client 600's password. Then, the KDC 900 sends the TGT, along with a KDC session key encrypted with the user key, back to the Kerberos Initialization Client. [Step 608].

The Kerberos Initialization Client 780 uses client 600's password to generate the user key, decrypts the KDC session key with the user key, stores the TGT and KDC session key in credentials cache 830, and then exits. [Step 609]. Credentials cache 830 is a data storage device used in the processing of the transaction that makes these data available to the CGI Service Interface 740.

CGI Service Interface 740 ASCII- and URL-encodes the credentials cache. [Step 611]. The CGI Service Interface 740 then sends the encoded credentials cache and a command form to Web Server 720, destroys the credentials cache, then exits. [Step 612]. Web Server 720 sends the encoded credentials cache and the command form to Web Browser 620. [Step 613].

In other words, once the Initialization Client 780 stores the information in the credentials cache 830, the Initialization Client 780 exits. Because the Initialization Client 780 embodies a transient process, all data that are included would normally be erased. A permission indicator and KDC session key, however, are temporarily stored in the credentials cache 830. The CGI Interface 740 extracts the contents of the credentials cache 830 and ASCII- and URL-encodes the contents. The CGI Interface 740 is also a transient process, and it is therefore necessary to extract and pass the information to web server 720 before exiting.

The web server 720 encrypts the encoded credentials cache and sends the data to the web browser 620, as well as a command form. Once the network server 700 sends the data to the client 600, all transient processes which handled the data exit and terminate and consequently, all authenticating information about client 600 is erased or removed. In order for client 600 to continue with the transaction, client 600 will have to refresh the memory of the server 720 and continue the second phase of the authentication process.

Because there is no information relating to the transactions residing on the network server 700 during the time period in between transactions, if an unauthorized individual manages to improperly access the network server 700, as already explained above, any information obtained would be of limited value and the integrity of the system would be retained.

2. Issuing a Command

Figure 6A:
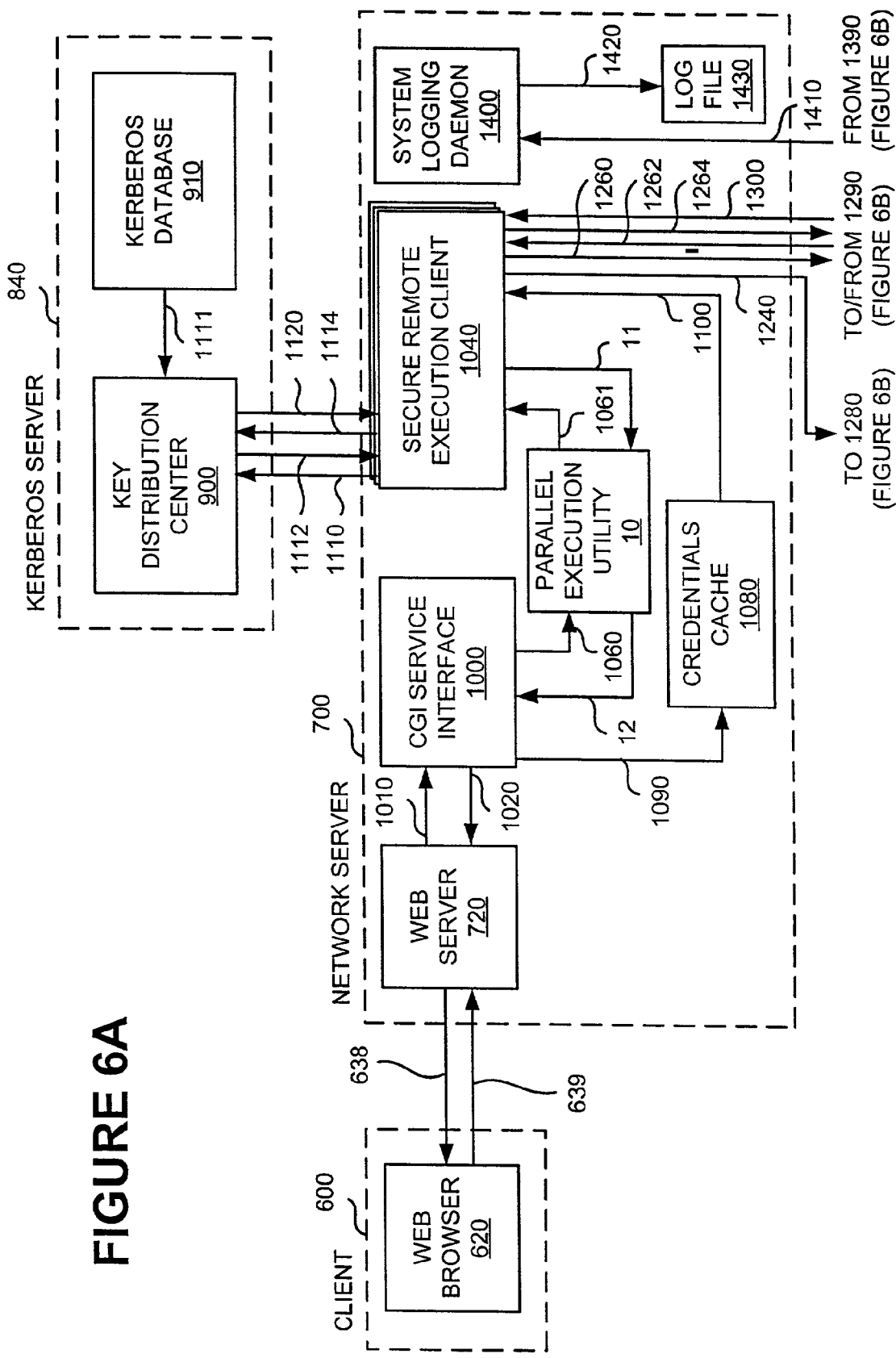
FIG. 6 is a block diagram showing additional aspects of the system of FIG. 4.
Figure 6B:
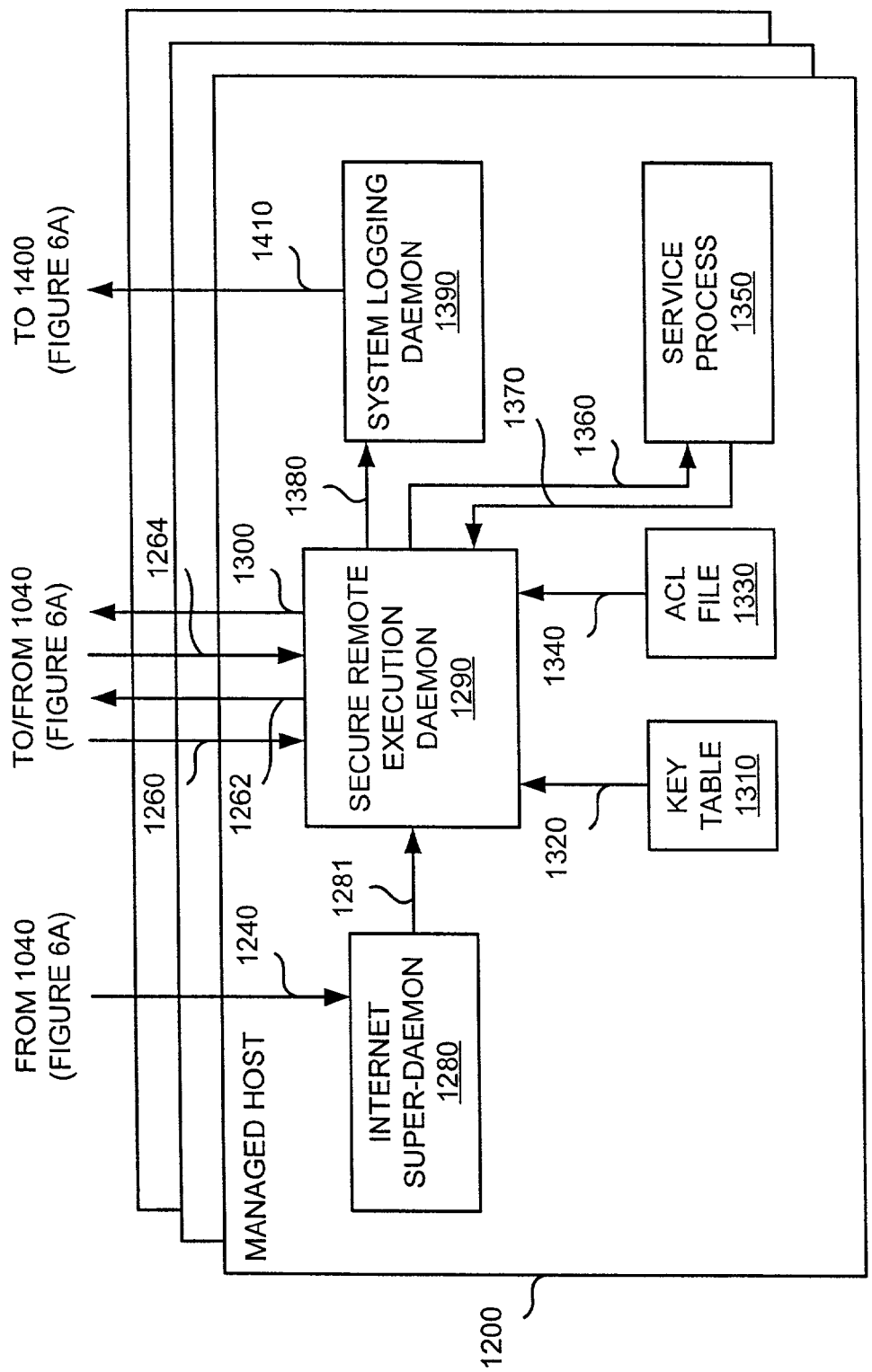
Figure 7A:
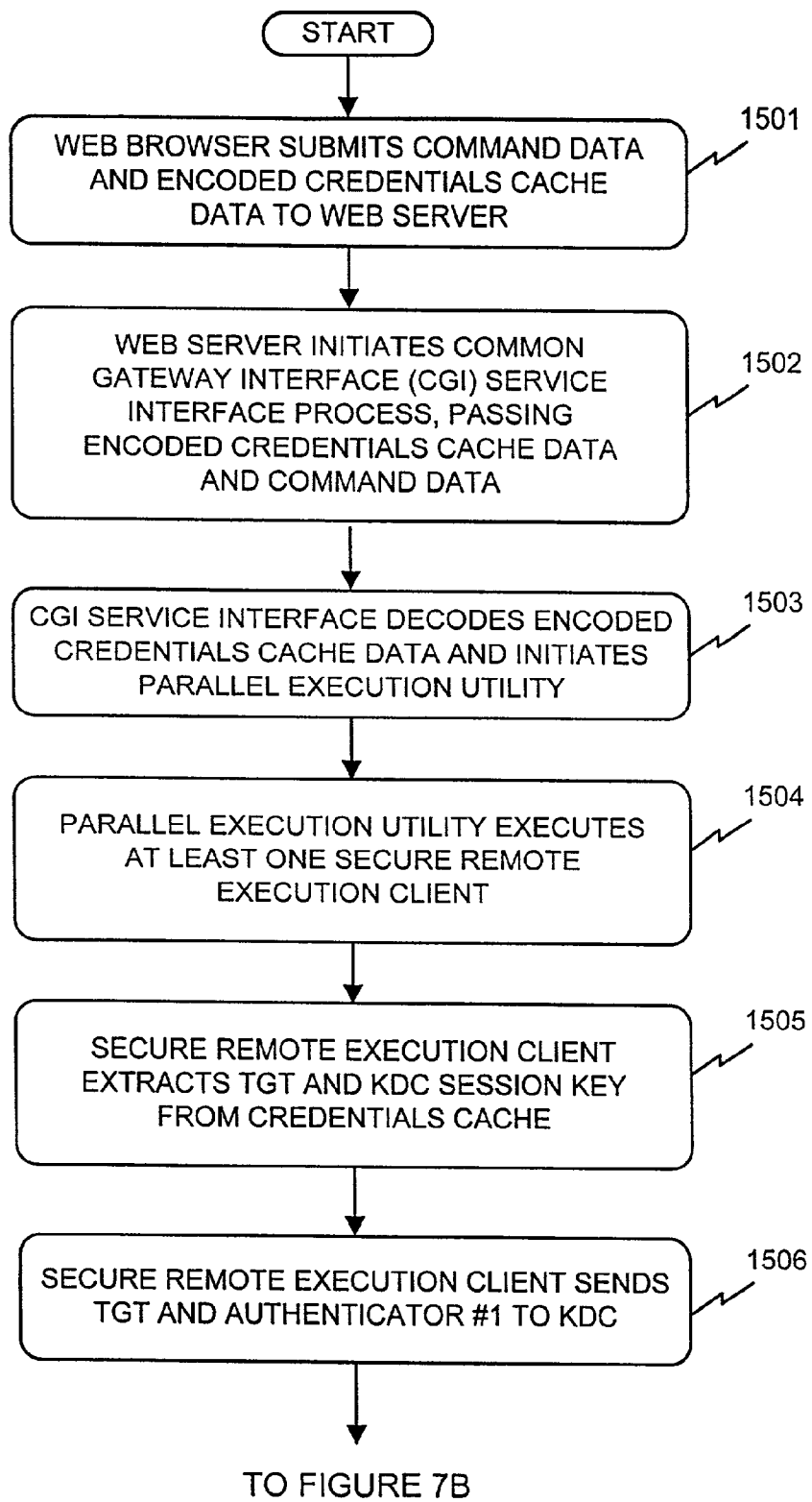
FIGS. 7a-7e are flow charts showing the operation of the system of FIG. 6 in accordance with the present invention.
Figure 7B:
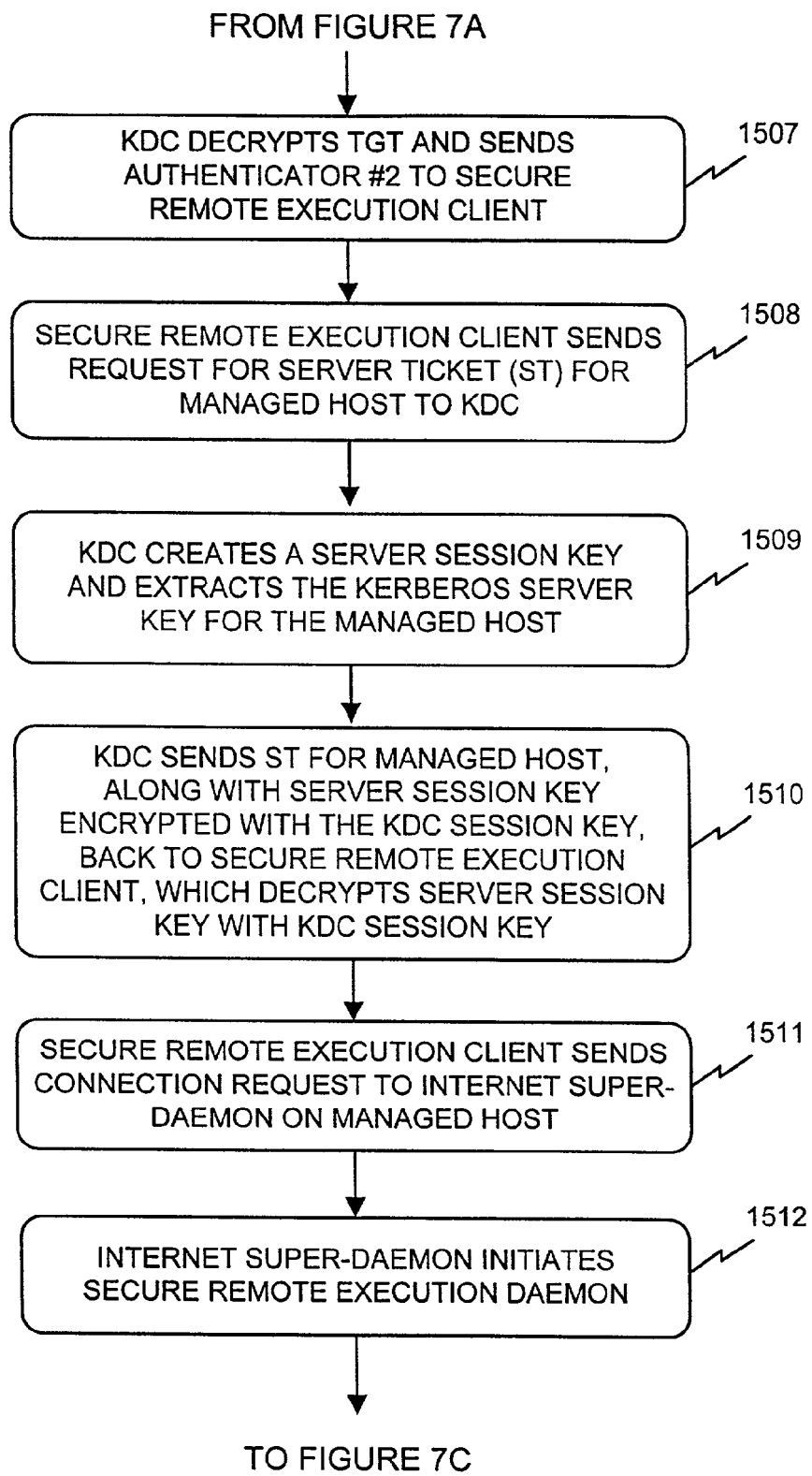
Figure 7C:
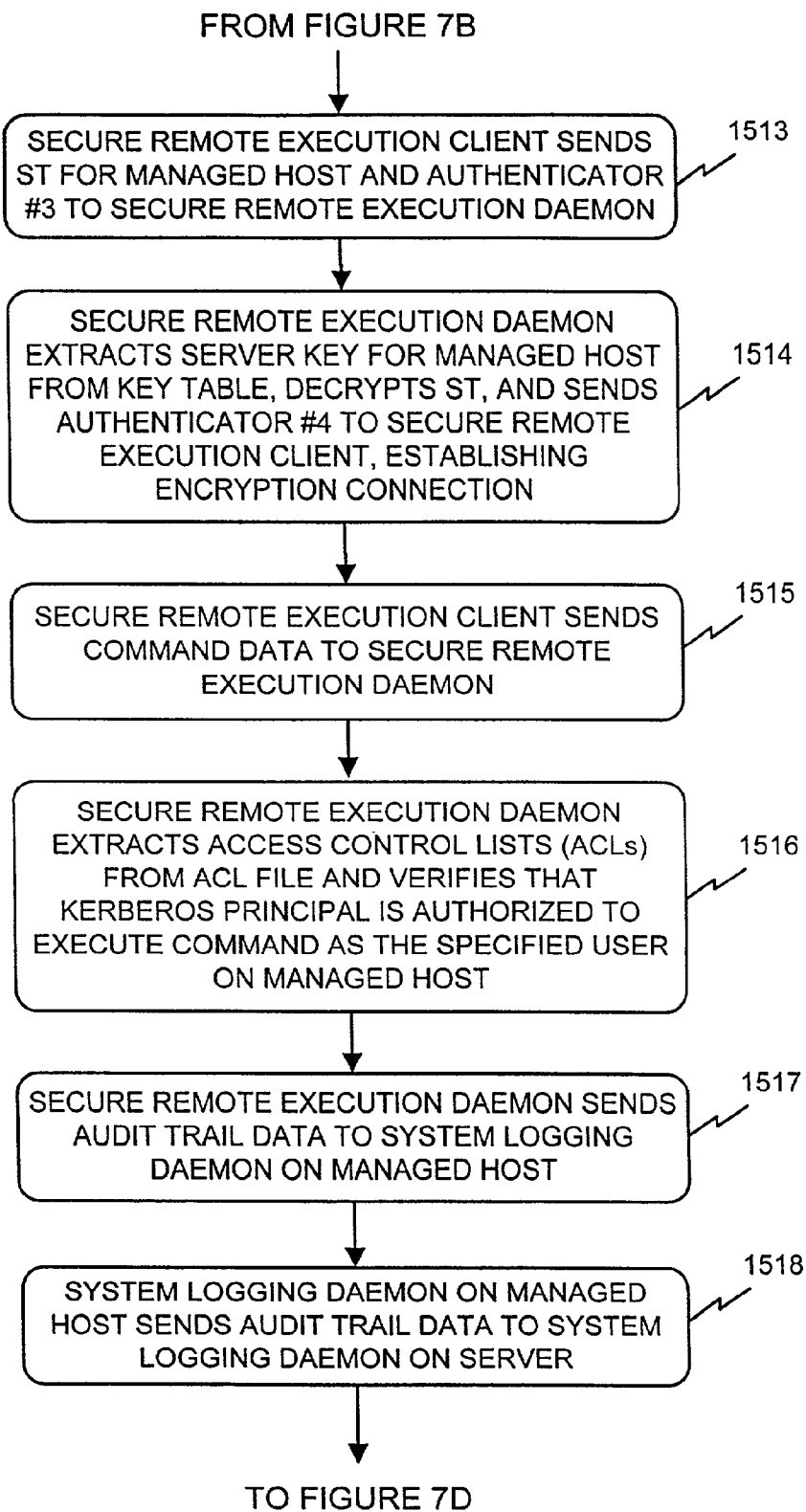
Figure 7D:
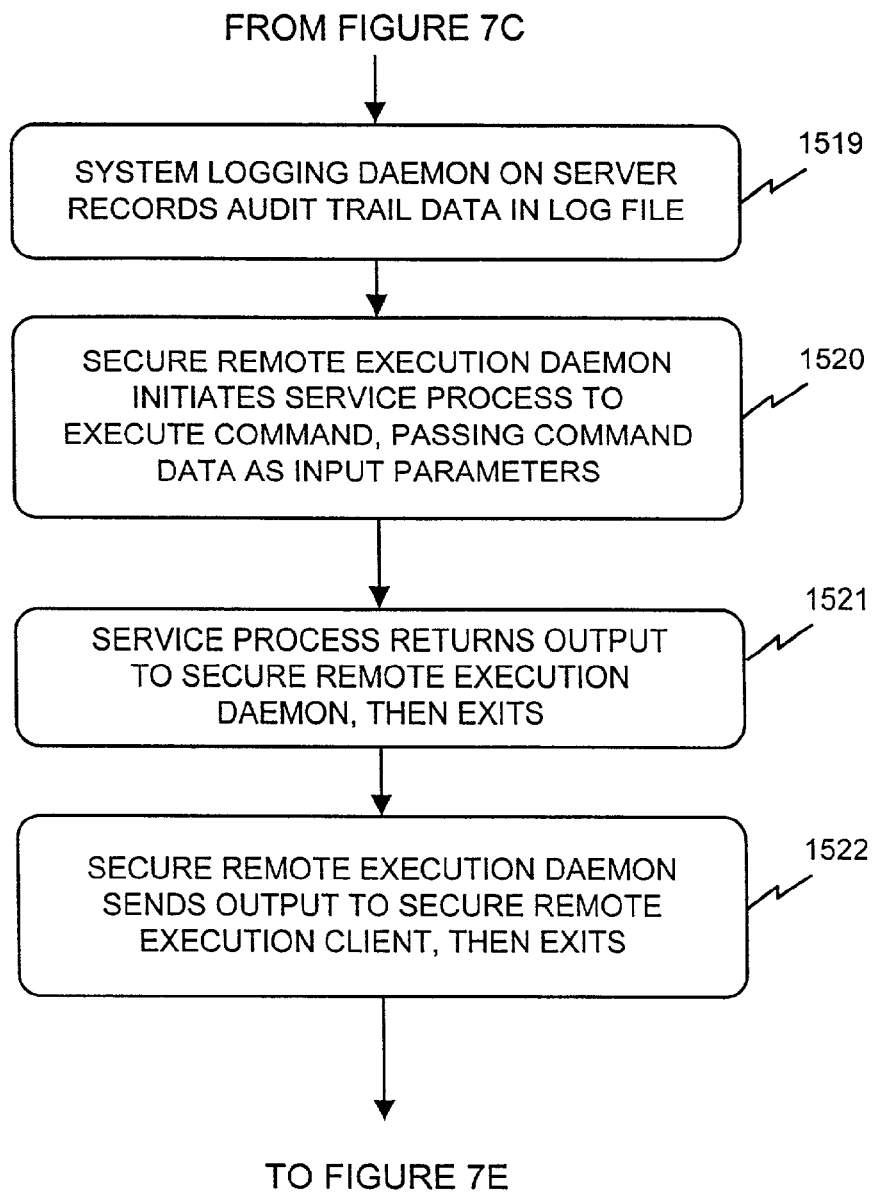
Figure 7E:
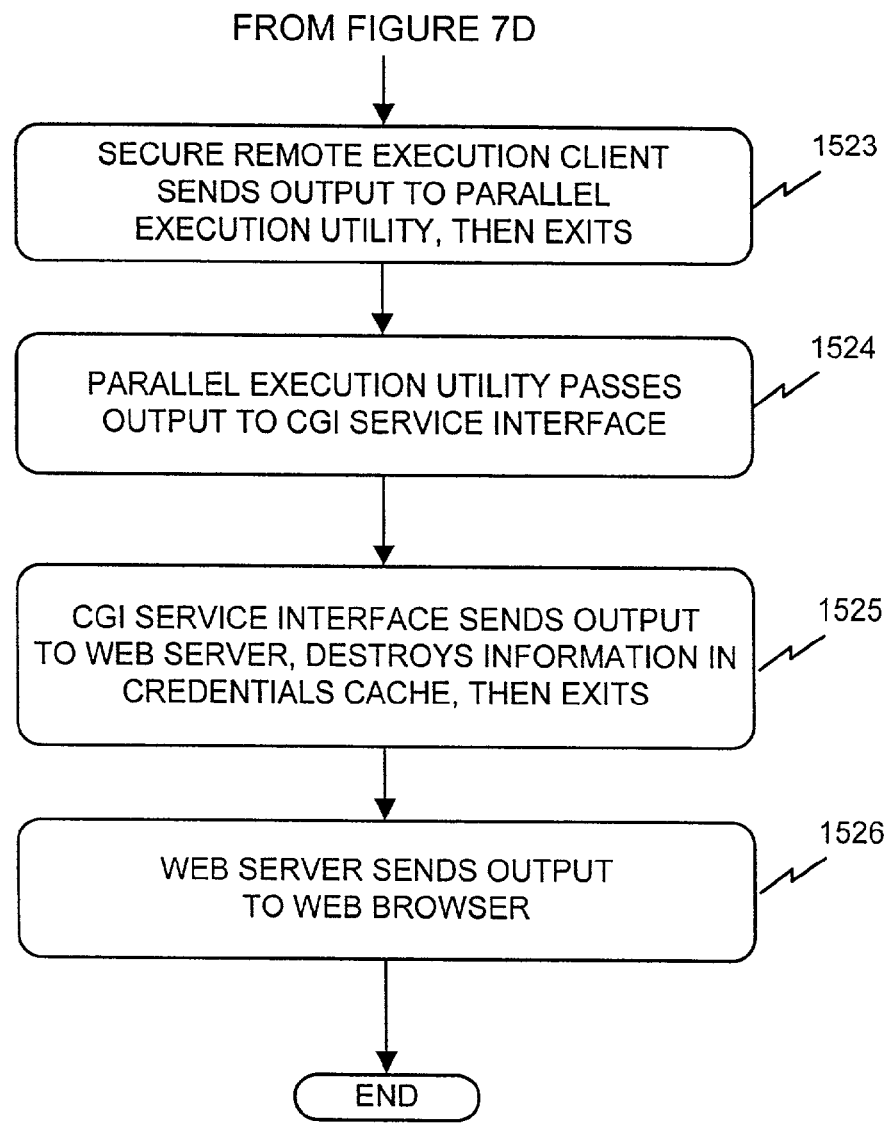

Once proper login has been accomplished as described in FIGS. 4 and 5-5*a*, a command can be issued from client 600 to the managed host 1200 as described in FIGS. 6 and 7-7*b*. Figure numbers in FIGS. 6 and 7-7*b* correspond to like structure and steps in FIGS. 4 and 5-5*a*.

With reference now to FIG. 6, web browser 620 of client 600 communicates with web server 720 of network server 700 as indicated by arrows 638 and 639. Web server 720 exchanges data with CGI Service Interface 1000 as indicated by arrows 1010 and 1020. CGI interface 1000 passes command data to the Secure Remote Execution Client 1040 as indicated at arrow 1060. The Secure Remote Execution Client 1040 is a process initiated by CGI Service Interface 1000.

CGI Service Interface 1000 also passes data to credentials cache 1080 as indicated at arrow 1090, and credentials cache 1080 in turn passes data including the TGT to the Secure Remote Execution Client 1040 as shown by arrow 1100. Secure Remote Execution Client 1040 communicates with the KDC 900 of Kerberos Server 840 as indicated by arrows 1110 and 1120.

The Secure Remote Execution Client 1040 can also send data to Managed Host 1200, indicated generally by dotted lines 1220, as shown by arrows 1240, 1260 and 1264. More specifically, the Secure Remote Execution Client 1040 sends data to Internet Super-Daemon 1280, as shown by arrow 1240, and also to the Secure Remote Execution Daemon 1290, as shown by arrows 1260 and 1264. Internet Super-Daemon 1280 may include a persistent daemon process. Secure Remote Execution Daemon 1290 may include a process initiated by Internet Super-Daemon 1280, as shown by arrow 1281. Secure Remote Execution Daemon 1290 also communicates with Secure Remote Execution Client 1040, as shown by arrows 1262 and 1300.

Secure Remote Execution Daemon 1290 has access to key table 1310, shown by arrow 1320, and also has access to ACL file 1330, as indicated by arrow 1340. Key table 1310 is preferably a file readable only by the root user on the managed host. The Secure Remote Execution Daemon 1290 further exchanges information with the Service Process 1350, which may include a process forked by the Secure Remote Execution Daemon 1290, as indicated by arrows 1360 and 1370. Secure Remote Execution Daemon 1290, as indicated by arrow 1380, can send data to System Logging Daemon 1390, which is a persistent daemon process. System Logging Daemon 1390 further communicates with System Logging Daemon 1400 of Server 700, as indicated by arrow 1410. System Logging Daemon 1400, which is a persistent daemon process, has access to log file 1410, as indicated by arrow 1420, for purposes of making a nonvolatile record of all secure remote execution activity.

With reference now to the flow charts of FIGS. 7-7B, the system of FIG. 6 operates in the following manner. Web browser 620 submits command data and encoded credentials cache to web server 720. [Step 1501]. Web server 720 executes CGI Service Interface 1000, and passes the encoded credentials cache in the environment and command data over standard input from web server 720 to CGI Interface 1000. [Step 1502].

CGI Service Interface 1000 decodes the encoded credentials cache and restores it to a credentials cache 1080. [Step 1503]. CGI Service Interface 1000 executes the Secure Remote Execution Client 1040, passing command data as input parameters from CGI. Service Interface 1000 to Secure Remote Execution Client 1040. [Step 1504]. The Secure Remote Execution Client 1040 extracts the TGT and KDC session key from credentials cache 1080. [Step 1505].

Then, the Secure Remote Execution Client 1040 sends the TGT and an authenticator #1 to KDC 900. [Step 1506]. The KDC 900 decrypts the TGT and sends authenticator #2 to Secure Remote Execution Client 1040. [Step 1507]. Secure Remote Execution Client 1040 then sends a request for a server ticket (ST) for Managed Host 1200 to KDC 900. [Step 1508]. KDC 900 creates a server session key and extracts the Kerberos server principal key for Managed Host 1200 from Kerberos database 910. [Step 1509]. KDC 900 creates a Kerberos ST, for Managed Host 1200 and then sends the ST, along with the server session key encrypted with the KDC session key, back to Secure Remote Execution Client 1040, which decrypts the server session key with the KDC session key. [Step 1510]. Then, the Secure Remote Execution Client 1040 sends the connection request to Internet Super-Daemon 1280 of Managed Host 1200. [Step 1511].

Internet Super-Daemon 1280 initiates the Secure Remote Execution Daemon 1290, passing command line parameters specifying encryption requirements. [Step 1512]. The Secure Remote Execution Client 1040 sends the ST for Managed Host 1200 and authenticator #3 to Secure Remote Execution Daemon 1290. [Step 1513]. The Secure Remote Execution Daemon 1290 extracts the server key for Managed Host 1200 from key table 1310, decrypts the ST and sends authenticator #4 to Secure Remote Execution Client 1040, establishing an encrypted connection. [Step 1514]. Secure Remote Execution Client 1040 then sends command data to Secure Remote Execution Daemon 1290. [Step 1515]. The Secure Remote Execution Daemon 1290 also extracts access-control lists (ACLs) from ACL file 1330, and verifies that the Kerberos principal is authorized to execute the command as the specified user on Managed Host 1200. [Step 1516].

The Secure Remote Execution Daemon 1290 also sends audit trail data (such as, for example, the Kerberos principal name, remote user and host names, local user name, and command data) to System Logging Daemon 1390 on Managed Host 1200. [Step 1517]. This is to provide a record of all secure remote execution activity. In turn, the System Logging Daemon 1390 can send audit trail data to System Logging Daemon 1400 on Server 700. [Step 1518]. The System Logging Daemon 1400 records audit trail data in log file 1410. [Step 1519].

The Secure Remote Execution Daemon 1290 executes Service Process 1350 to execute the command and passes command data as input parameters. [Step 1520]. The Service Process 1350, which is a process forked by Secure Remote Execution Daemon 1290, returns output to Secure Remote Execution Daemon 1290, and then exits. [Step 1521]. The Secure Remote Execution Daemon 1290 sends output to Secure Remote Execution Client 1040, and then exits. [Step 1522]. The Secure Remote Execution Client 1040 sends output to CGI Service Interface 1000, and then exits. [Step 1523]. The CGI Service Interface 1000 sends output to Web Server 720, destroys credentials cache 1080 and, then exits. [Step 1524]. Web Server 720 then sends output to Web Browser 620. [Step 1525]. This allows the user at the client system to see the results of the command that was executed.

DESCRIPTION OF THE PREFERRED EMBODIMENT

The preferred embodiment of the present invention utilizes structure for executing a platform-independent method and apparatus for secure remote operations. In other words, another aspect of the present invention is to accommodate managed hosts operating on any computing platform, not just those supporting server-side Kerberos services. For example, a need has arisen to provide for secure remote operations between a client and a Microsoft Windows®-based managed host. The following preferred embodiment addresses this desire for accommodating managed hosts running on any platform.

1. The Login Procedure

The login procedure for platform-neutral secure remote operations can be accomplished in a similar fashion to that described above (see FIGS. 4 and 5-5a and accompanying description).

2. Issuing a Command

Once proper login has been accomplished, as described in FIGS. 4 and 5-5a, a command can be issued from a client to a managed host, as described in FIGS. 8 and 9A-9D. The term "arrow" as used in the description represents the sequence of data flow and not necessarily the structure between system elements. Thus, multiple data flows represented by multiple arrows between common elements may actually occur in sequence over a single physical connection, for example.

Figure 8:
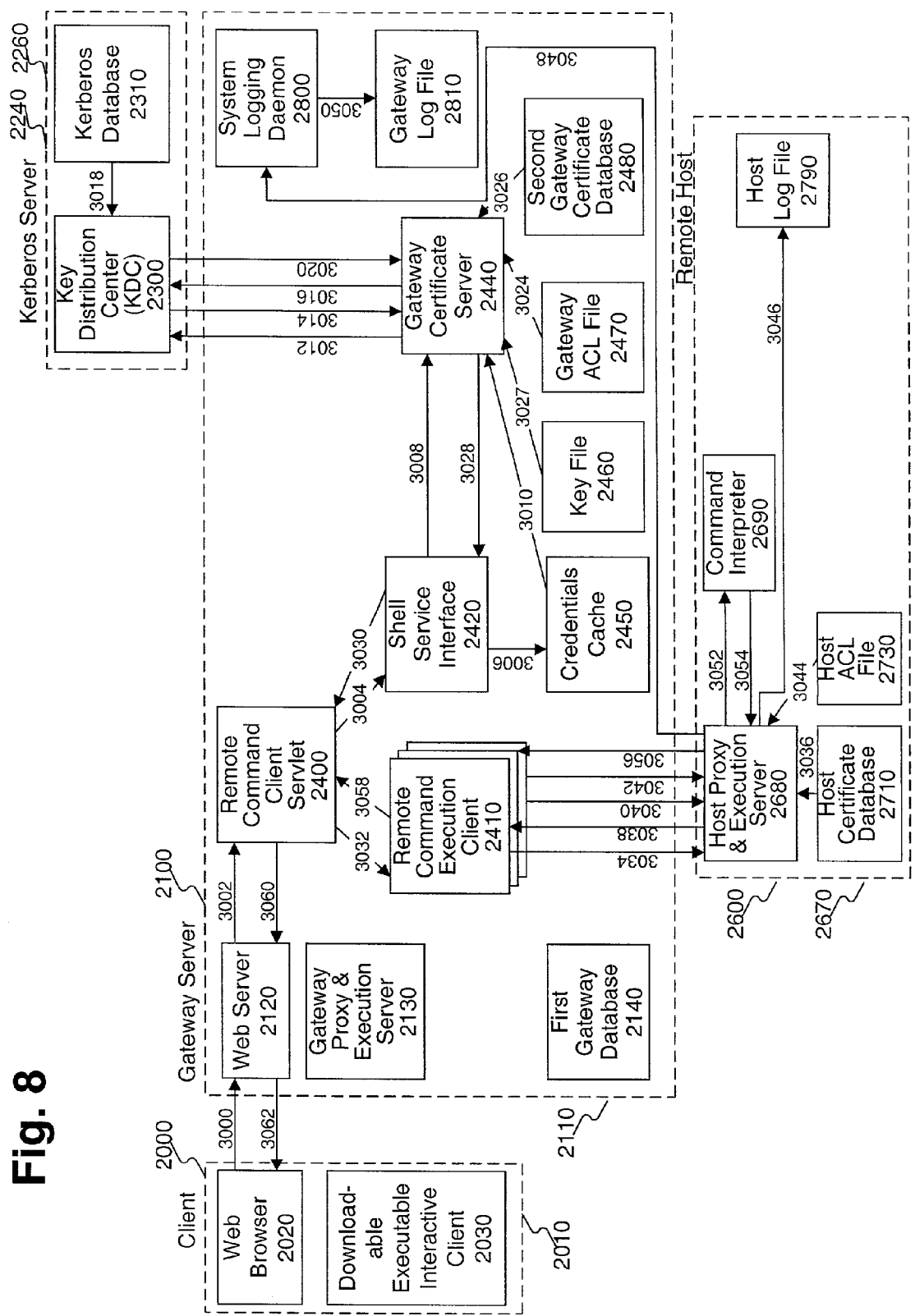
FIG. 8 is a block diagram of a system for implementing platform-neutral secure remote operations in accordance with the present invention.
Figure 9B:
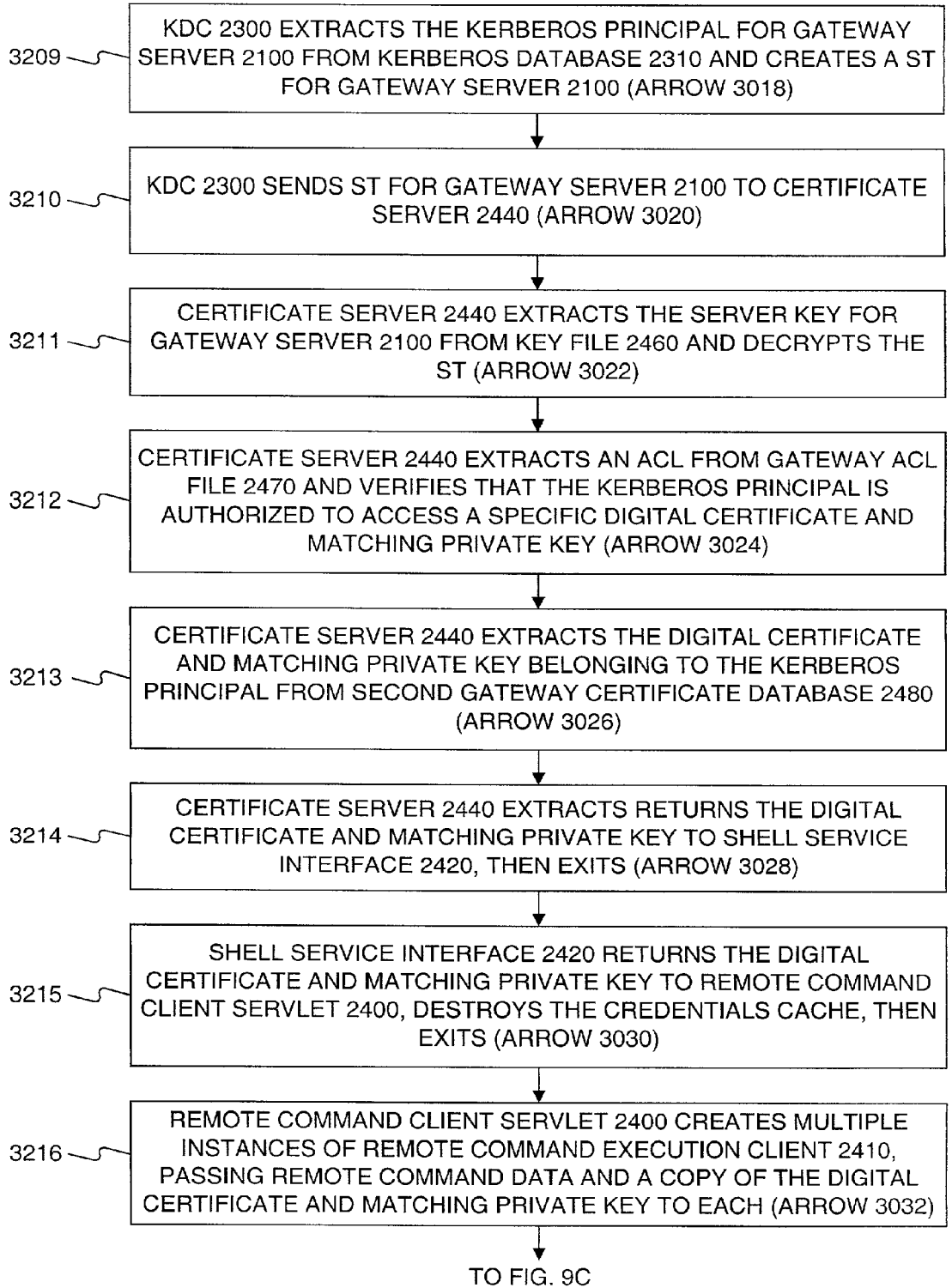
Figure 9C:
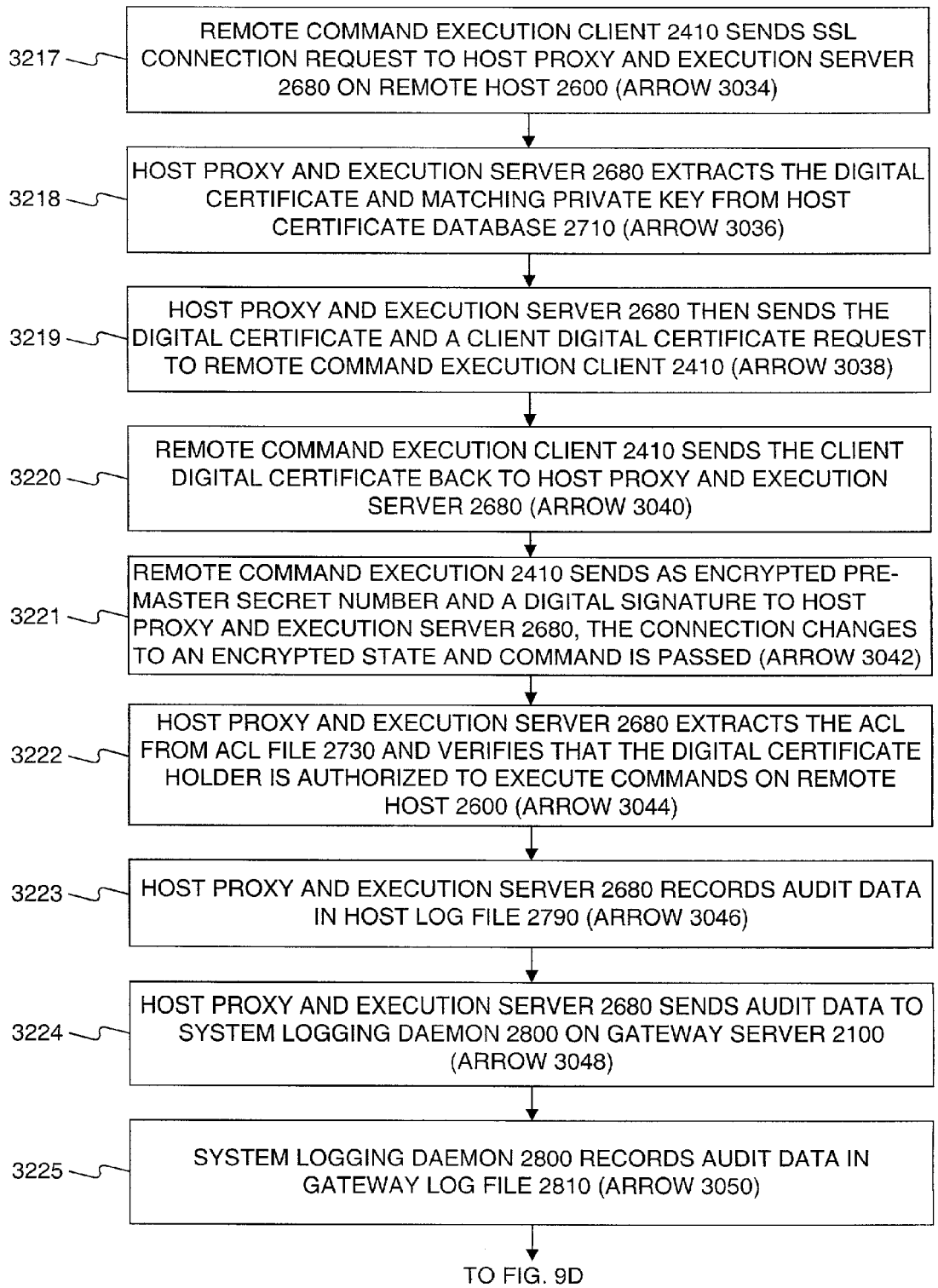
Figure 9D:
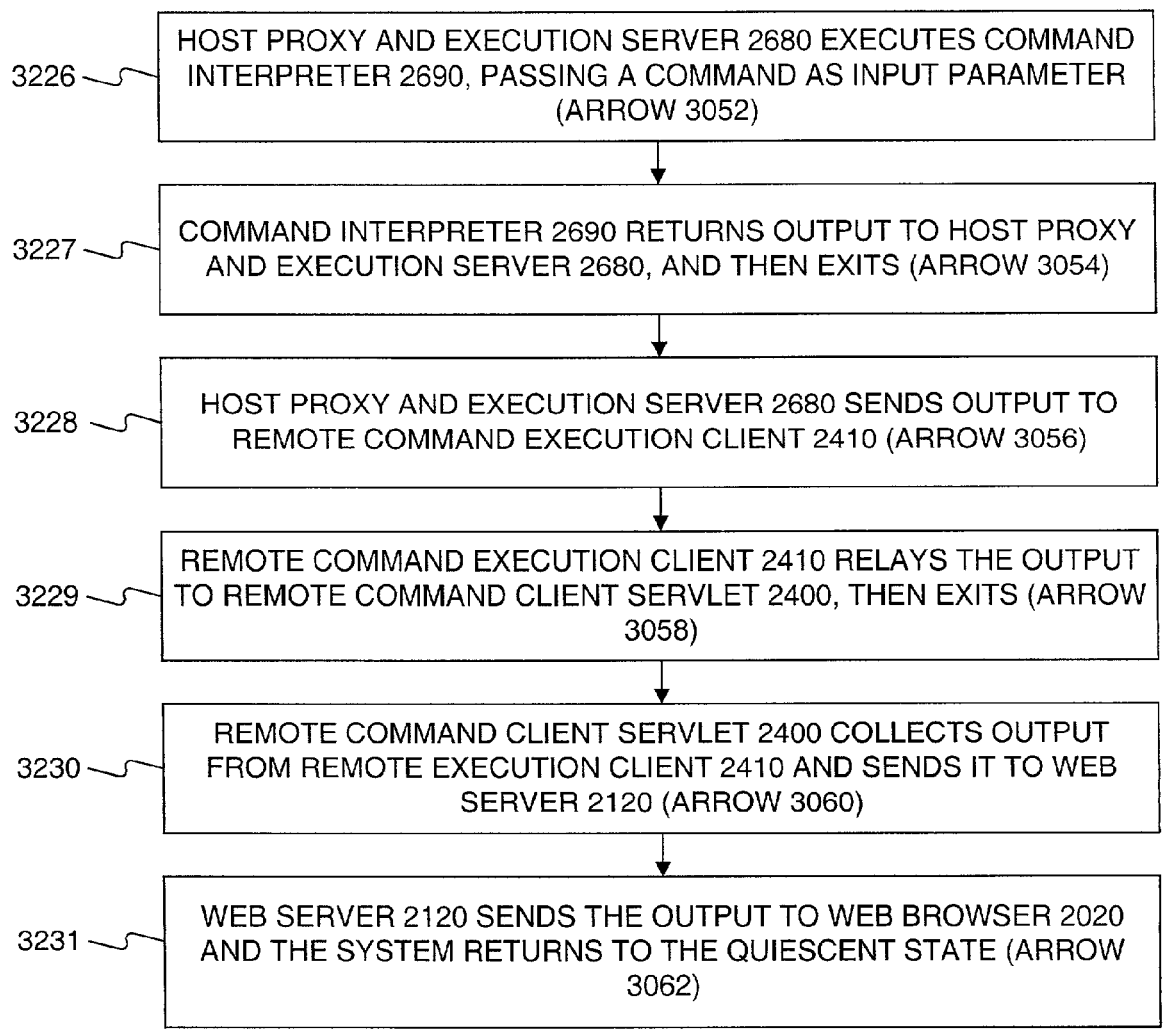
Figure 10:
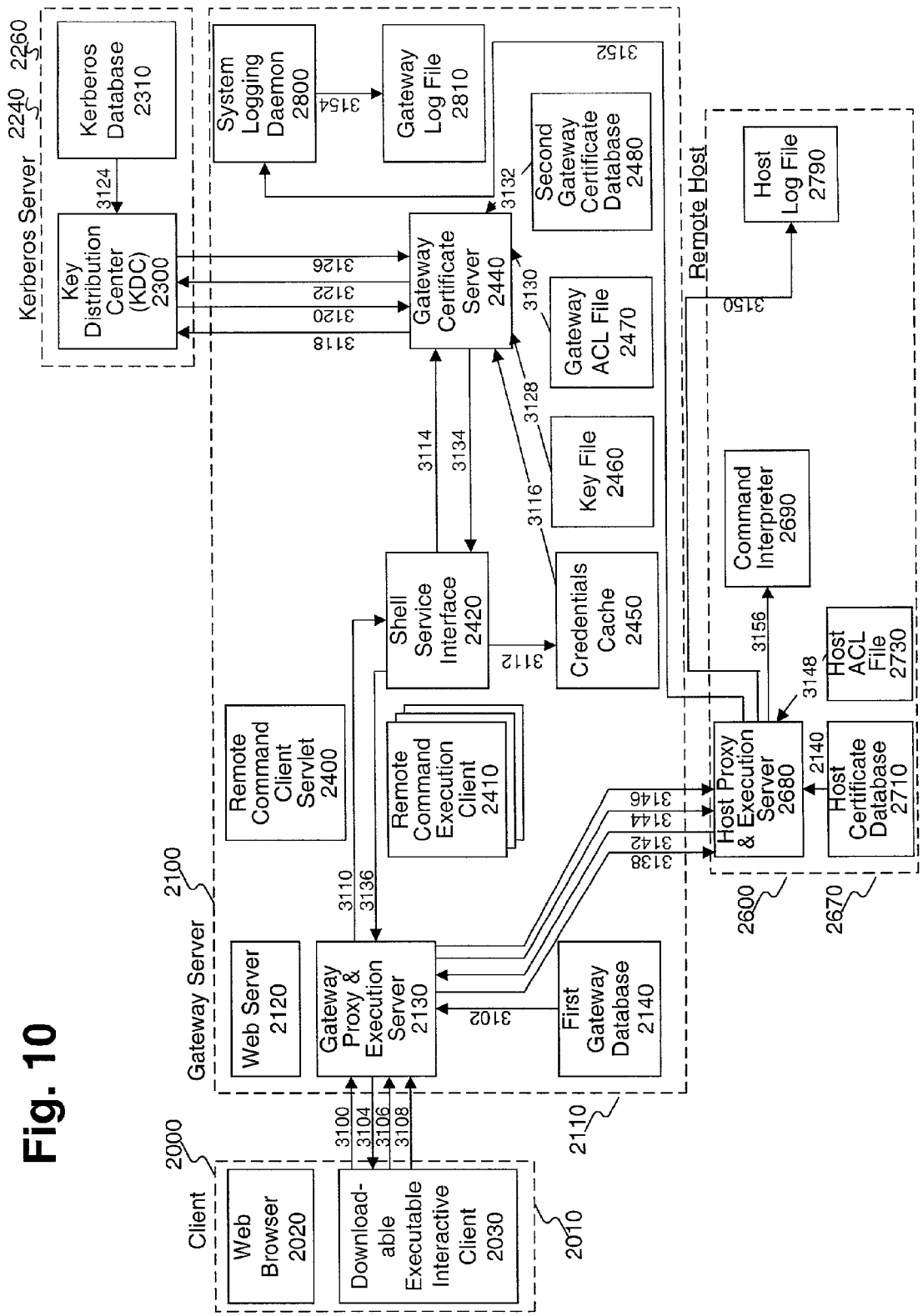
FIG. 10 is a block diagram of a system for implementing platform-neutral remote interactive login connections in accordance with the present invention.
Figure 11A:
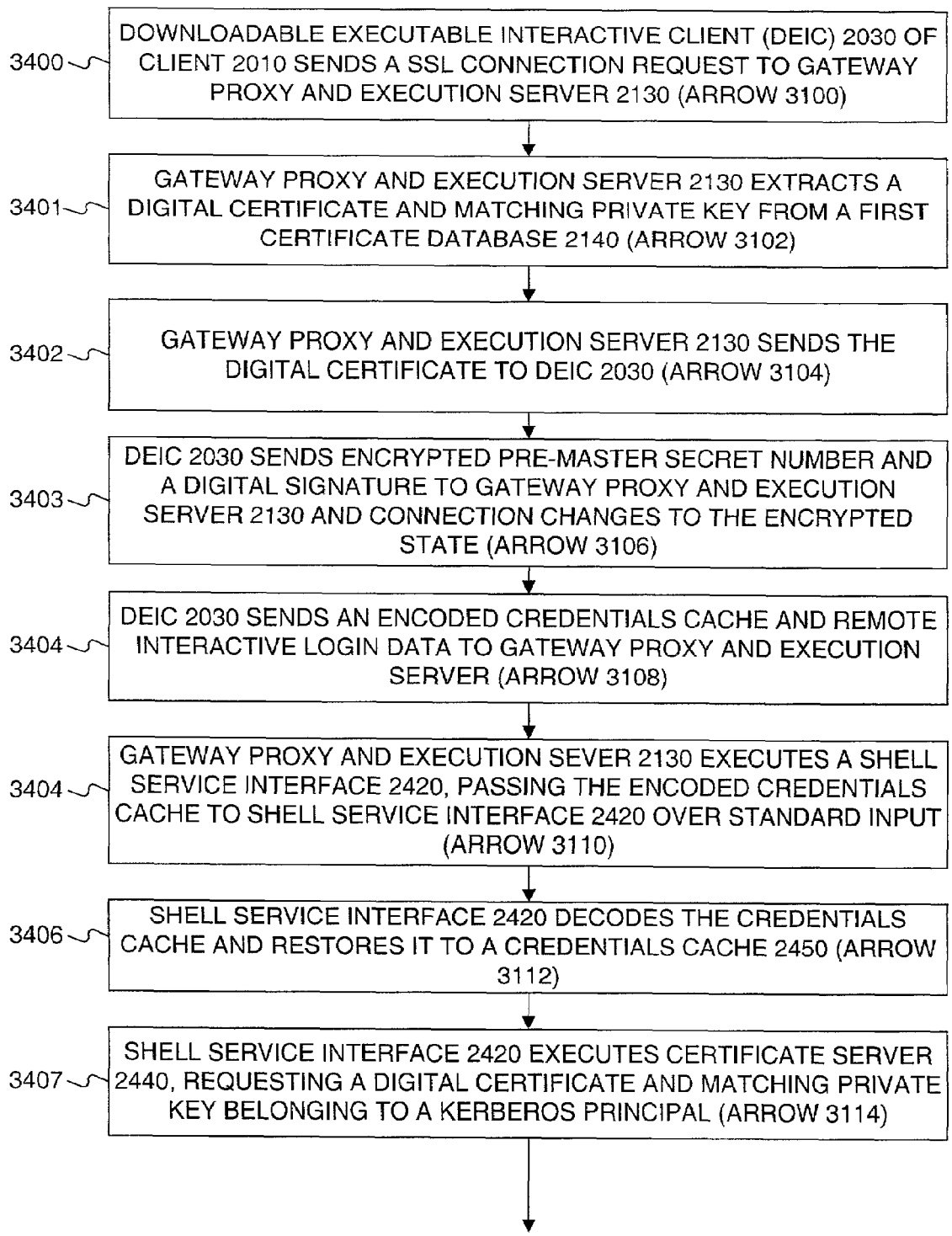
FIGS. 11A-11D are flow charts showing the operation of the system of FIG. 10 in accordance with the present invention.
Figure 11B:
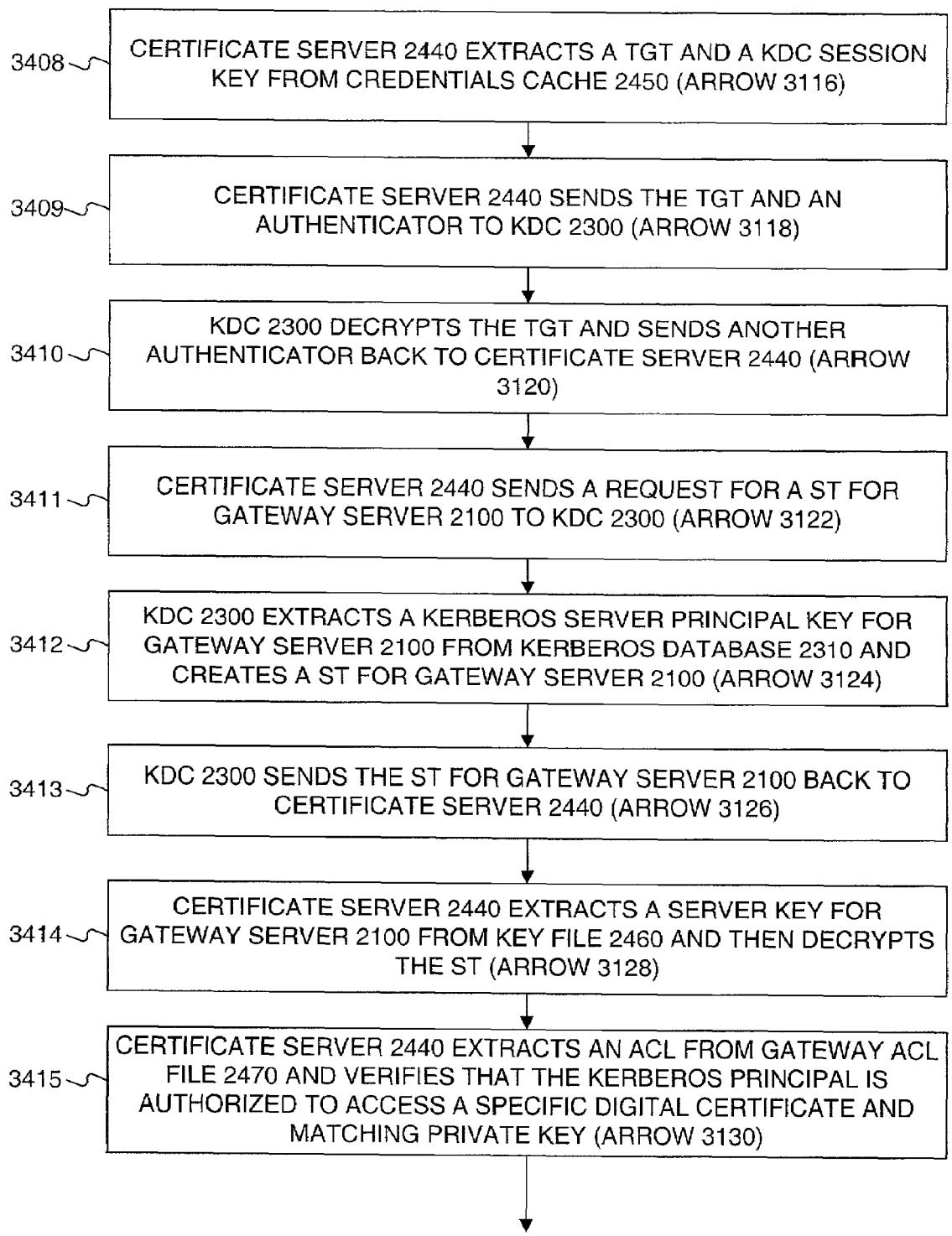
Figure 11C:
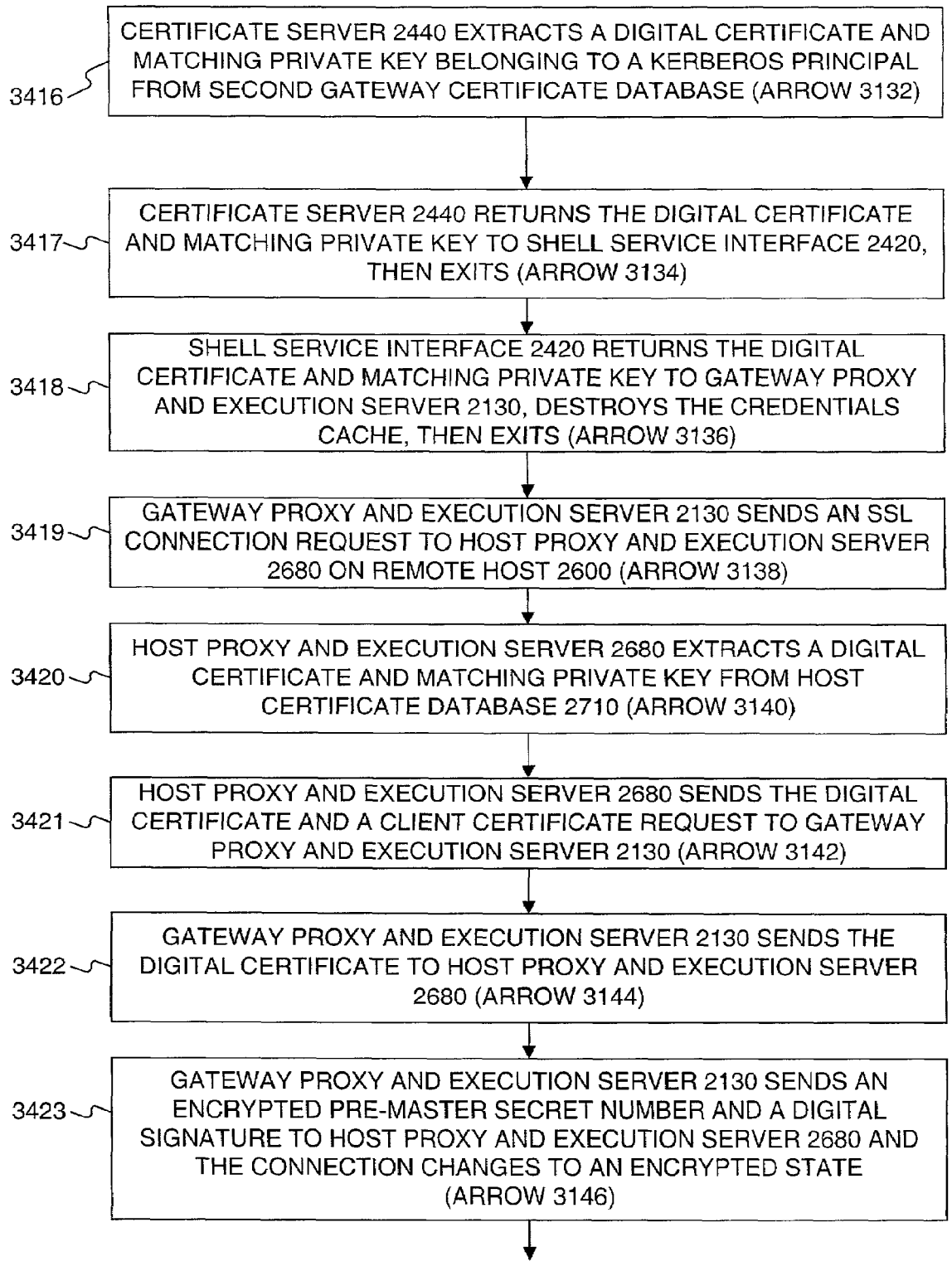
Figure 11D:
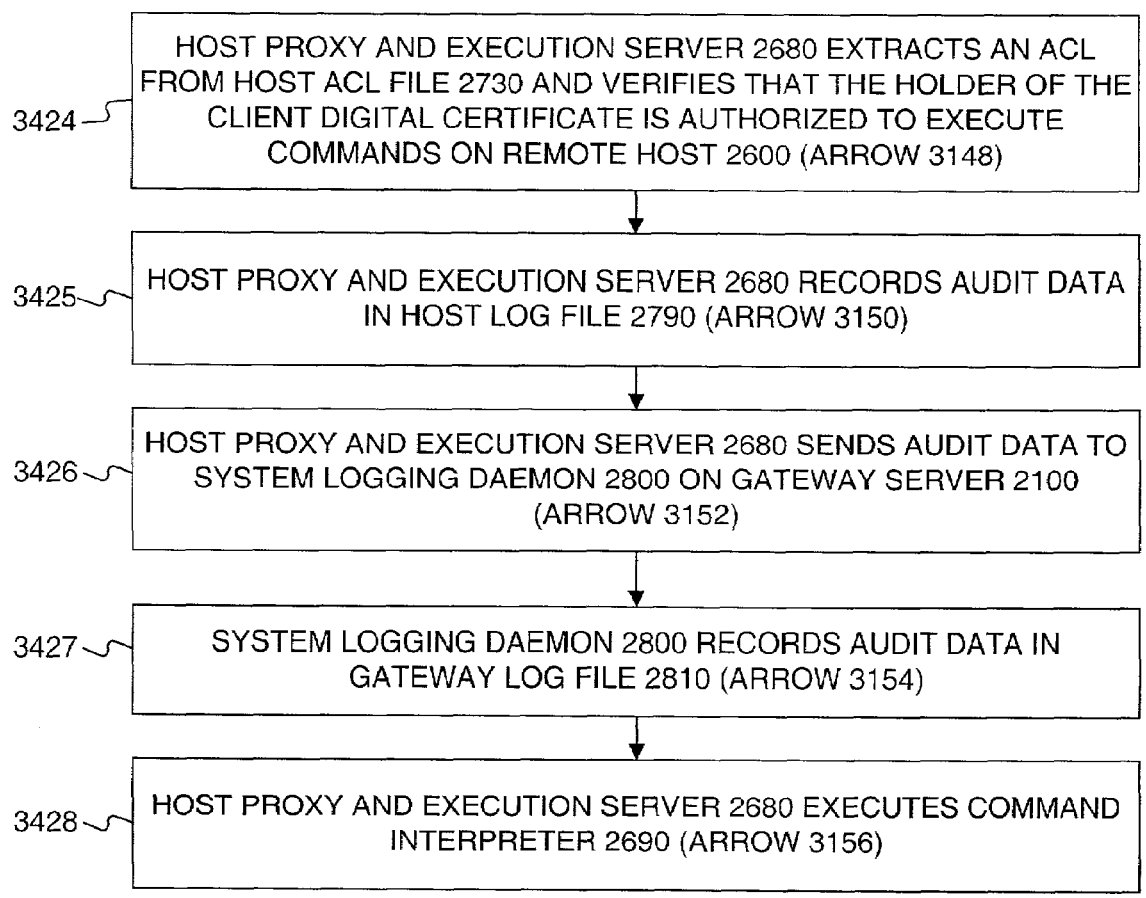

With reference to FIG. 8, a client 2000, indicated generally by dotted lines 2010, comprises web browser 2020. Web browser 2020 communicates with gateway network server 2100, which is indicated generally by dotted lines 2110. As will be further described below, arrows 3000 and 3062 indicate the exchange of data and information between web browser 2020 and web server 2120. Web server 2120 exchanges data and information with a remote command client servlet 2400, as indicated by arrows 3002 and 3062. Remote command client servlet 2400 is a Java extension that runs on a server within a web server process context, such as web server 2120.

Remote command client servlet 2400 creates one or more instances of a remote command execution client 2410 to communicate with a remote host 2600, as indicated generally by dotted lines 2610. Remote command client servlet 2400 communicates with each remote command execution client 2410, as indicated by arrows 3032 and 3058. In turn, remote command execution client 2410 exchanges information with remote host 2600 via a host proxy and execution server (PES) 2680, as indicated by arrows 3034, 3038, 3040, 3042, and 3056.

Host PES 2680 retrieves information from a host certificate database 2710 and a host ACL file 2730, as indicated by arrows 3036 and 3044, respectively. Host PES 2680 may comprise, for example, Knothole™ proxy and execution software by Verizon Technology. Host certificate database 2710 is an entity that stores cryptographic certificates (e.g., X.509 certificates) and matching private keys. Host PES 2680 also initiates a command interpreter 2690 for executing commands issued by client 2000. Host PES 2680 transfers data with command interpreter 2690 as indicated by arrows 3052 and 3054.

Remote command client servlet 2400 optionally executes a transient process within gateway server 2100, namely, shell service interface 2420. Servlet 2400 communicates with shell service interface 2420 as indicated by arrows 3004 and 3030. In turn, shell service interface 2420 interacts with a gateway certificate server 2440 (as indicated by arrows 3008 and 3028) and a credentials cache 2450 (as indicated by arrow 3006). In the absence of shell service interface 2420, remote command client servlet 2400 performs the same functions. Credentials cache 2450 holds a permission indicator (such as a ticket-granting ticket or TGT) and a KDC session key. Thus, the TGT and KDC session key are collectively referred to herein as "credentials" consistent with the Kerberos protocol; however, it should be appreciated that other security protocols and other client-authenticating data and information may be used in accordance with the present invention. The permission indicator and KDC session key are eventually passed to the gateway certificate server 2440 Gateway certificate server 2440 links gateway server 2100 with Kerberos Server 2240, as indicated generally by dotted lines 2260. In particular, gateway certificate server 2440 exchanges information with KDC 2300, as indicated by arrows 3012, 3014, 3016, and 3020. KDC 2300 extracts principal keys for gateway server 2100 from a Kerberos database 2310, as indicated by arrow 3018. Gateway certificate server 2440 also retrieves information from a key file 2460, a gateway ACL file 2470, and a second gateway certificate database 2480.

Once proper login has been accomplished as described in FIGS. 4 and 5-5a, web browser 2020 sends an encoded credentials cache and some remote command data (comprising, for example, a remote host list, a remote user name, and a command) to web server 2120 [step 3200 of FIG. 9]. At step 3201, Web server 2120 then executes a remote command client servlet 2400 and passes the encoded credentials cache and remote command data to servlet 2400.

The remote command client servlet 2400 then executes shell service interface 2420 and passes the encoded credentials cache over standard input from servlet 2400 to the shell service interface 2420 [step 3202]. Shell service interface 2420 decodes the encoded credentials cache and restores it to a credentials cache 2450, which thus includes credentials for the Kerberos principal [step 3203].

At step 3204, shell service interface 2420 executes a certificate server 2440, requesting X.509 digital certificate and matching private key belonging to the Kerberos principal. Certificate server 2440 then extracts a ticket-granting ticket (TGT) and KDC session key (which KDC 2300 generated during initial login) from credentials cache 2450 [step 3205]. The TGT comprises the KDC session key encrypted with the KDC's permanent key. At step 3206, certificate server 2440 then sends the ticket-granting ticket and a fifth authenticator to KDC 2300. The fifth authenticator is a data structure which is encrypted by certificate server 2440 using the KDC session key. Next, KDC 2300 decrypts the ticket-granting ticket with the KDC's permanent key and extracts the KDC session key. KDC 2300 then sends a sixth authenticator, a data structure encrypted with the KDC session key, back to certificate server 2440 [step 3207]. Certificate server 2440 thus verifies the identity of KDC 2300, since only KDC 2300 could have decrypted the TGT (using the KDC permanent key, which is only known to the KDC 2300) to extract the KDC session key.

The certificate server 2440 then sends a request for a server ticket (ST) for use with gateway server 2100 to KDC 2300 [step 3208]. At step 3209, KDC 2300 extracts the Kerberos server principal key for gateway server 2100 from Kerberos database 2310 and creates a ST for gateway server 2100. Next, at step 3210, KDC 2300 sends a ST for gateway server 2100 back to certificate server 2440. Certificate server 2440 extracts the server key for gateway server 2100 from key file 2460 and decrypts the ST [step 3211]. If the ST is decrypted successfully, gateway server 2100 has authenticated the Kerberos principal.

Certificate server 2440 also extracts an access-control list from gateway ACL file 2470 and verifies that the Kerberos principal is authorized to access a specific X.509 digital certificate and matching private key [step 3212]. Certificate server 2440, having been authorized, extracts a X.509 digital certificate and matching private key belonging to the Kerberos principal from second gateway certificate database 2480 [step 3213]. At step 3214, certificate server 2440 returns the X.509 digital certificate and matching private key to shell service interface 2420, and then exits.

At step 3215, shell service interface 2420 returns the X.509 digital certificate and matching private key to remote command client servlet 2400, destroys the credentials cache, and then exits. At this point, remote command client servlet 2400 has the ability to perform SSL negotiations.

In order to talk to multiple parallel hosts, remote command client servlet 2400 creates multiple instances of remote command execution client 2410, one for each remote host on the remote host list [step 3216]. Remote command client servlet 2400 also passes remote command data (comprising, for example, remote host name and command) and a copy of the X.509 digital certificate and matching private key to each instance of remote command execution client 2410.

For each instance of remote command execution client 2410, an SSL handshake must be performed with each remote host 2600. A single example of such a handshake will now be described. One skilled in the art should note that any variant of SSL handshake may be used so long as the variant supports bi-directional authentication and encryption.

At step 3217, remote command execution client 2410 sends an SSL connection request to host PES 2680 on remote host 2600. Host PES 2680 extracts the X.509 digital certificate and matching private key from the host certificate database 2710 [step 3218]. Host PES 2680 may cache the X.509 digital certificate and matching private key after this extraction. Host PES 2680 then sends the client X.509 digital certificate and a client digital certificate request back to remote command execution client 2410 [step 3219]. Remote command execution client 2410 sends a client X.509 digital certificate back to host PES 2680 [step 3220]. At step 3221, remote command execution client 2410 sends an encrypted pre-master secret number (used to generate a session key) and a digital signature to host PES 2680. At this point, the connection between remote command execution client 2410 and host PES 2680 changes to encrypted state. The command is then sent from gateway server 2100 to remote host 2600.

At step 3222, host PES 2680 extracts the access-control list from ACL file 2730 and verifies that the holder of the client X.509 digital certificate is authorized to execute commands on remote host 2600.

The following logging functions are then performed. Host PES 2680 records audit data in host log file 2790 [step 3223]. Moreover, host PES 2680 sends audit data to system logging daemon 2800 on gateway server 2100 [step 3224], where system logging daemon 2800 records audit data in gateway log file 2810 [step 3225].

Next, a command is executed on remote host 2600. Host PES 2680 executes a command interpreter 2690, passing a command as input parameter [step 3226]. Command interpreter 2690 returns output to host PES 2680, and then exits [step 3227]. Host PES 2680 then sends output to remote command execution client 2410 [step 3228]. Remote command execution client 2410 relays the output to remote command client servlet 2400, and then exits [step 3229].

At step 3230, remote command client servlet 2400 collects output from each of the multiple remote execution clients 2410 and sends them serially to Web server 2120. Finally, at step 3231, Web server 2120 sends the output to Web browser 2020, and the system returns to quiescent state.

Another aspect of the present invention is to enhance security for a remote login connection without regard to the operating platform of a remote host. An exemplary system for enhancing security for a remote login connection will now be described with reference to FIGS. 10 and 11A-11D.

A client 2000, indicated generally by dotted lines 2010, comprises web browser 2020 and a downloadable executable interactive client (DEIC) 2030. DEIC 2030 is a program designed to be executed by another application, namely web browser 2020, and may comprise, for example, a Java applet. DEIC 2030 communicates with network server 2100 (which is indicated generally by dotted lines 2110) via gateway PES 2130. Gateway PES 2130 may comprise, for example, Knothole™ software by Verizon Technology. As will be further described below, arrows 3100, 3104, 3106, and 3108 indicate the exchange of information between DEIC 2030 and gateway PES 2130.

Gateway PES 2130 extracts information from first gateway certificate database 2140, as indicated by arrow 3102. In turn, gateway PES 2130 exchanges information with remote host 2600 via a host PES 2680, as indicated by arrows 3138, 3142, 3144, and 3146.

Host PES 2680 retrieves information from a host certificate database 2710 and a host ACL file 2730, as indicated by arrows 3140 and 3148, respectively. Host PES 2680 may comprise, for example, Knothole™ software by Verizon Technology. Host certificate database 2710 is an entity that stores cryptographic certificates (e.g., X.509 certificates) and matching private keys. Host PES 2680 also initiates a command interpreter 2690 for executing commands issued by client 2000. Host PES 2680 transfers data to command interpreter 2690 as indicated by arrow 3156.

Gateway PES 2130 optionally executes a transient process within gateway server 2100, namely, shell service interface 2420. Gateway PES 2130 communicates with shell service interface 2420 as indicated by arrows 3110 and 3136. In turn, shell service interface 2420 interacts with a gateway certificate server 2440 (as indicated by arrows 3114 and 3134) and a credentials cache 2450 (as indicated by arrow 3112). In the absence of shell service interface 2420, gateway PES 2130 performs the same functions. Credentials cache 2450 holds a permission indicator (such as a ticket-granting ticket) and a KDC session key. The permission indicator and KDC session key are eventually passed to the gateway certificate server 2440

Gateway certificate server 2440 links gateway server 2100 with Kerberos Server 2240, as indicated generally by dotted lines 2260. In particular, gateway certificate server 2440 exchanges information with KDC 2300, as indicated by arrows 3118, 3120, 3122, and 3126. KDC 2300 extracts principal keys for gateway server 2100 from a Kerberos database 2310, as indicated by arrow 3124. Gateway certificate server 2440 also retrieves information from a key file 2460, a gateway ACL file 2470, and a second gateway certificate database 2480.

Now with reference to FIGS. 11A-11D, a remote interactive login connection is initiated when DEIC 2030 of client 2010 sends a SSL connection request to a gateway PES 2130 resident in server 2100 [step 3400]. Gateway PES 2130 then extracts a X.509 digital certificate and a matching private key from a first gateway certificate database 2140 [step 3401]. Gateway PES 2130 may cache the X.509 digital certificate and matching private key after this extraction. At step 3402, gateway PES 2130 sends the X.509 digital certificate to DEIC 2030.

DEIC 2030 sends an encrypted pre-master secret number (used to generate a session key) and a digital signature to gateway PES 2130 [step 3403] and the connection changes to an encrypted state. DEIC 2030 then sends an encoded credentials cache and remote interactive login data (comprising of, for example, a remote host name and port) to gateway PES 2130 [step 3404].

Gateway PES 2130 then executes a shell service interface 2420, passing the encoded credentials cache to the shell service interface 2420 over standard input [step 3405]. Shell service interface 2420 decodes the encoded credentials cache and restores it to a credentials cache 2450 [step 3406]. Shell service interface 2420 also executes a certificate server 2440, requesting a X.509 digital certificate and matching private key belonging to a Kerberos principal [step 3407].

Certificate Server 2440 then extracts a ticket-granting ticket (TGT) and a KDC session key from credentials cache 2450 [step 3408]. The TGT comprises the KDC session key encrypted with the KDC's permanent key. Next, at step 3409, Certificate Server 2440 sends the ticket-granting ticket and a seventh authenticator to KDC 2300. The seventh authenticator is a data structure which is encrypted by Certificate Server 2440 using the KDC session key. KDC 2300 then decrypts the TGT with the KDC's permanent key and extracts the KDC session key. KDC 2300 then sends an eighth authenticator, a data structure encrypted with the KDC session key, back to certificate server 2440 [step 3410].

Certificate Server 2440 then sends a request for a ST for gateway server 2100 to KDC 2300 [step 3411]. In reply, KDC 2300 extracts a Kerberos server principal key for gateway server 2100 from Kerberos database 2310 and creates a ST for gateway server 2100 [step 3412]. At step 3413, KDC 2300 then sends the ST for gateway server 2100 back to certificate server 2440.

Certificate Server 2440 extracts a server key for gateway server 2100 from a key file 2460 and then decrypts the ST [step 3414]. Moreover, certificate server 2440 extracts an access-control list from a gateway ACL file 2470 and verifies that the Kerberos principal is authorized to access a specific X.509 digital certificate and matching private key [step 3415].

Certificate Server 2440 extracts a X.509 digital certificate and matching private key belonging to a Kerberos principal from second gateway certificate database 2480 [step 3416]. Finally, certificate server 2440 returns the X.509 digital certificate and matching private key to shell service interface 2420, then exits [step 3417].

Shell service interface 2420 returns the X.509 digital certificate and matching private key to gateway PES 2130, destroys the credentials cache, and then exits [step 3418].

Now, a SSL handshake is performed between gateway server 2100 and remote host 2600. Gateway PES 2130 sends an SSL connection request to host PES 2680 on remote host 2600 [step 3419]. Host PES 2680 extracts a X.509 digital certificate and matching private key from a host certificate database 2710 [step 3420]. Host PES 2680 may cache the X.509 digital certificate and matching private key after this extraction. Host PES 2680 then sends the X.509 digital certificate and a client certificate request to gateway PES 2130 [step 3421]. Gateway PES 2130 sends the X.509 digital certificate back to host PES 2680 [step 3422]. Gateway PES 2130 also sends an encrypted pre-master secret number (used to generate session key) and a digital signature to host PES 2680 and the connection changes to an encrypted state [step 3423].

Host PES 2680 extracts an access-control list from a host ACL file 2730 and verifies that the holder of the client X.509 digital certificate is authorized to execute commands on Remote Host 2600 [step 3424].

Host PES 2680 records audit data in host log file 2790 [step 3425]. Host PES 2680 also sends audit data to system logging daemon 2800 on gateway server 2100 [step 3426]. Moreover, system logging daemon 2800 on gateway server 2100 records audit data in gateway log file 2810 [step 3427].

Finally, Host PES 2680 executes a Command Interpreter 2690 which readies itself to receive and execute commands from remote clients [step 3428].

It should be understood that more than one server and client can be used, and that this invention is equally applicable to multiple clients and multiple destination servers.

As used herein, it is understood that the term "secure," as applied to a network server, a destination server, and a KDC, denotes that information stored in the servers is accessible under normal, expected operating conditions only by suitably authorized individuals.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of enhancing the security of a message sent by a principal from a client computer through a network server to a destination server, comprising the steps of:
   (a) obtaining by the client computer credentials for authorizing the principal client and the network server;
   (b) establishing a first secure connection for exchanging data between the client and the network server;
   (c) transmitting from the client computer to the network server over the first secure connection the principal-authenticating credentials and the message;
   (d) transmitting the principal-authenticating credentials from the network sever to the validation center;
   (e) transmitting permission data for the network server from the validation center to the network sever based on the principal-authenticating credentials;
   (f) verifying the authorization of the principal in the network sever to access a digital certificate and issuing the digital certificate to the network server;
   (g) establishing a second secure connection for exchanging data between the network server and the destination server based on the digital certificate; and
   (h) transmitting the message from the network server to the destination server over the second secure connection.

2. The method of claim 1, wherein the establishing step (b) utilizes the Secure Sockets Layer (SSL) protocol.

3. The method of claim 1, wherein the establishing step (b) further comprises the substeps of:
   transmitting from the network server to the client server a network server key associated with a public-private key pair and a known cryptographic algorithm;
   transmitting from the client server to the network server a session key encrypted using the known cryptographic algorithm and the network server key, and
   transmitting from the network server to the client server information encrypted using the known cryptographic algorithm and the session key to authenticate the network server to the client serve.

4. The method of claim 1, wherein the establishing step (g) utilizes the Secure Sockets Layer (SSL) protocol.

5. The method of claim 1, wherein the establishing step (g) further comprises the substeps of:
transmitting from the destination server to the network server a destination server key associated with a public-private key pair and a known cryptographic algorithm;
transmitting from the network server to the destination server a session key encrypted using the known cryptographic algorithm and the destination server key; and
transmitting from the destination server to the network server information encrypted using the known cryptographic algorithm and the session key to authenticate the destination server to the network server.

6. The method of claim 1, wherein the obtaining step (a) further comprises the substeps of:
sending a request for credentials for the principal to the validating center;
receiving the credentials for the principal for from the validation center, and
storing the credentials in the client computer.

7. The method of claim 1 wherein the principal-authenticating credentials comprise a ticket-granting ticket and a session key.

8. The method of claim 7 wherein the transmitting step (d) further comprises the substep of:
transmitting from the network server to the validating center a ticket-granting ticket and an authenticator.

9. The method of claim 8 wherein the ticket-granting ticket comprises a session key encrypted with a permanent key for the validation center.

10. The method of claim 9 wherein the authenticator is a data structure encrypted using the session key.

11. The method of claim 10 wherein the transmitting step (e) further comprises the substep of:
decrypting the ticket-granting ticket at the validation center to extract a session key.

12. The method of claim 11 wherein the permission data comprises an authenticator.

13. The method of claim 12 wherein the authenticator comprises a data structure encrypted with the session key.

14. The method of claim 1 further comprising the steps of:
transmitting a request for a server ticket from the network server to the validation center;
creating a server ticket for the network server at the validation center; and
receiving the server ticket from the validation center at the network server.

15. The method of claim 5 wherein the verifying step (f) further includes the substeps of:
extracting an access control list and verifying that the principal is authorized to access a digital certificate and a destination server key; and
issuing a digital certificate and a destination server key.

16. The method of claim 15 wherein the digital certificate conforms with the X.509 standard.

17. The method of claim 1 wherein the establishing step (g) further comprises the substep of: establishing a secure connection from the network server to more than one destination server.

18. The method of claim 17 wherein each connection between the network server and a destination server is managed by a separate remote command execution client.

19. The method of claim 1 wherein the validation center utilizes a Kerberos protocol.

20. The method of claim 1 wherein the message comprises command data.

21. The method of claim 20 wherein the command data comprise a remote user name, a destination server list, and a command.

22. The method of claim 1 further comprising the step of temporarily storing the principal-authenticating information.

23. A method of providing a remote interactive login connection for a principal from a client computer through a network server to a destination server, comprising the steps of:
(a) obtaining credentials for authorizing the principal from a validation center;
(b) establishing a first secure connection for exchanging data between the client and the network server;
(c) transmitting from the client computer to the network server over the first secure connection the principal-authenticating credentials;
(d) transmitting the principal-authenticating credentials from the network server to the validation center;
(e) transmitting permission data for the network server from the validation center to the network server based on the principal-authenticating credentials;
(f) verifying the authorization of the principal in the network server to access a digital certificate and issuing the digital certificate to the network server;
(g) establishing a second secure connection for exchanging data between the network server and the destination server based on the digital certificate; and
(h) executing a command interpreter in the destination server wherein the command interpreter may execute commands sent by the client computer via the network server over the second secure connection.

24. A computer system for enhancing the security of one or more messages sent by a principal comprising:
a client computer for transmitting principal-authenticating credentials and the one or more messages;
a gateway computer operatively connected to the client computer, the gateway computer receiving principal-authenticating credentials and the one or more messages from the client computer;
a validation computer operatively connected to the gateway computer and capable of receiving the principal-authenticating credentials from to gateway computer and of transmitting permission data based on the principal-authenticating credentials to the gateway computer; and
one or more host computers operatively connected to the gateway computer and operating on any computer platform,
wherein, based on the permission data, the gateway computer establishes a secure connection with at least one of the one or more host computers, and
wherein the gateway computer transmits the one or more messages to at least one of the host computers over the secure connection.

25. The system of claim 24 wherein the gateway computer further comprises a gateway certificate server for transmitting the principal-authenticating credentials to the validation center and for receiving the permission data from the validation computer.

26. The system of claim 24 wherein the gateway computer further comprises one or more remote command execution clients for establishing one or more secure connections to the one or more host computers based on the permission data.

27. The system of claim 24 wherein each of to one or more host computers further comprises a host proxy and execution server for establishing a secure connection between each of the one or more host computers and the gateway computer.

28. The system of claim 27 wherein the host proxy and execution server executes a command interpreter for executing commands contained in the one or more messages.

29. A computer system for providing a remote interactive login connection comprising:
- a client computer for transmitting principal-authenticating credentials and a message:
- a gateway computer operatively connected to the client computer, the gateway computer receiving the principal-authenticating credentials and the message from the client computer
- a validation computer operatively connected to the gateway computer and capable of receiving the principal-authenticating credentials from the gateway computer and of transmitting permission data based on the principal-authenticating credentials to the gateway computer; and
- one or more host computers operatively connected to the gateway computer and operating on any computer platform,
- wherein, based on the permission data, the gateway computer establishes a secure connection with the host computer, and transmits the message to the host computer over the secure connection.

30. The system of claim 29 wherein the gateway computer further comprises a gateway proxy and execution server for establishing a secure connection to the at Least one host computer based on the permission data.

31. The system of claim 29 wherein the host computer further comprises a host proxy and execution server for establishing a secure connection between the at least one host computer and the gateway computer.

32. The system of claim 31 wherein the host proxy and execution server executes a command interpreter for executing commands.

33. The system of claim 29 wherein the client computer further comprises a downloadable executable interactive client (DEIC) for establishing a secure connection with the gateway computer.

34. The system of claim 33 wherein the downloadable executable interactive client (DEIC) comprises a Java applet.

35. The system of claim 29 wherein the gateway computer temporarily stores the principal-authenticating information.

36. A computer program product, the computer program product comprising a computer readable storage medium and a computer program stored therein for carrying out a process comprising:
- (a) obtaining by the client computer credentials for authorizing the principal from a validation center;
- (b) establishing a first secure connection for exchanging data between a client and a network server;
- (c) transmitting from the client computer to the network server over the first secure connection the principal-authenticating credentials and the message;
- (d) transmitting the principal-authenticating credentials from the network server to the validation center;
- (e) transmitting permission data for the network server from the validation center to the network server based on the principal-authenticating credentials;
- (f) verifying the authorization of the principal in the network server to access a digital certificate and issuing the digital certificate to the network server;
- (g) establishing a second secure connection for exchanging data between the network server and a destination server based on the digital certificate; and
- (h) transmitting the message from the network server to the destination server over the second secure connection.

* * * * *